US009064070B2

(12) United States Patent
Ikeda et al.

(10) Patent No.: US 9,064,070 B2
(45) Date of Patent: Jun. 23, 2015

(54) INDICATOR-BASED PRODUCT DESIGN OPTIMIZATION TO FIND DEFECTIVE AND NON-DEFECTIVE STATUS

(75) Inventors: Hiroshi Ikeda, Yokohama (JP); Hidetoshi Matsuoka, Yokohama (JP)

(73) Assignee: FUJITSU SEMICONDUCTOR LIMITED, Yokohama (JP)

( * ) Notice: Subject to any disclaimer, the term of this patent is extended or adjusted under 35 U.S.C. 154(b) by 204 days.

(21) Appl. No.: 13/022,359

(22) Filed: Feb. 7, 2011

(65) Prior Publication Data

US 2011/0231173 A1     Sep. 22, 2011

(30) Foreign Application Priority Data

Mar. 16, 2010 (JP) ................................ 2010-059337

(51) Int. Cl.
*G06F 17/50* (2006.01)
*G11C 29/50* (2006.01)

(52) U.S. Cl.
CPC ............ *G06F 17/5036* (2013.01); *G11C 29/50* (2013.01); *G11C 29/50004* (2013.01); *G11C 29/50012* (2013.01); *G11C 2029/5002* (2013.01); *G11C 2029/5004* (2013.01); *G11C 2029/5006* (2013.01); *G06F 17/5045* (2013.01); *G06F 2217/08* (2013.01); *G06F 2217/10* (2013.01); *G06F 17/5009* (2013.01)

(58) Field of Classification Search
USPC ........ 703/1, 2, 13, 14; 716/56, 112, 115, 132, 716/136

See application file for complete search history.

(56) References Cited

U.S. PATENT DOCUMENTS

| 7,802,218 | B2 * | 9/2010 | Inoue et al. .................... 716/111 |
| 7,917,872 | B2 * | 3/2011 | Tanefusa et al. ............... 716/103 |
| 7,934,178 | B2 * | 4/2011 | Arimoto ........................ 716/100 |
| 8,006,220 | B2 * | 8/2011 | McConaghy et al. ......... 716/132 |
| 8,024,674 | B2 * | 9/2011 | Arimoto ......................... 716/51 |
| 8,037,430 | B2 * | 10/2011 | Papanikolaou et al. ......... 716/56 |
| 8,050,901 | B2 * | 11/2011 | Lin ................................. 703/14 |
| 8,139,431 | B2 * | 3/2012 | Deng et al. .................... 365/201 |
| 8,447,547 | B2 * | 5/2013 | Jung et al. ...................... 702/69 |
| 8,533,653 | B2 * | 9/2013 | Anai et al. .................... 716/136 |
| 2005/0246148 | A1 * | 11/2005 | Levitan et al. .................... 703/2 |
| 2005/0257178 | A1 * | 11/2005 | Daems et al. ..................... 716/2 |

(Continued)

FOREIGN PATENT DOCUMENTS

| JP | 2003-337842 A | 11/2003 |
| JP | 2007-72591 A | 3/2007 |

OTHER PUBLICATIONS

Zitzler, Eckart; Kunzli, Simon, "Indicator-Based Selection in Multiobjective Search" PPSN VIII (Sep. 2004) available from <http://citeseerx.ist.psu.edu/viewdoc/summary?doi=10.1.1.69. 1604>.*

(Continued)

*Primary Examiner* — Kamini S Shah
*Assistant Examiner* — Jay B Hann
(74) *Attorney, Agent, or Firm* — Arent Fox LLP

(57) ABSTRACT

Disclosed is a simulation method for simulating an operation of a device. The simulation method includes specifying, by a computer, a boundary between a non-defective status and a defective status of a product in design space with a design parameter as an origin. The boundary is specified according to a search using a search indicator defined based on an operating state different from an operating state of a determination indicator that determines the non-defective status and the defective status of the operation.

4 Claims, 20 Drawing Sheets

(56) References Cited

U.S. PATENT DOCUMENTS

| | | | |
|---|---|---|---|
| 2008/0141190 A1* | 6/2008 | Jung et al. | 716/4 |
| 2009/0228846 A1* | 9/2009 | McConaghy et al. | 716/4 |
| 2010/0076741 A1* | 3/2010 | Takeuchi | 703/14 |
| 2011/0078100 A1* | 3/2011 | Goel | 706/13 |
| 2011/0161055 A1* | 6/2011 | Cases et al. | 703/1 |

OTHER PUBLICATIONS

Basseur, M.; Burke, E.K. "Indicator-Based Multi-Objective Local Search" IEEE Congress on Evolutionary Computation (2007).*

Dolecek, Lara, et al. "Breaking the Simulation Barrier: SRAM Evaluation Through Norm Minimization" IEEE Proceeding ICCAD '08, pp. 322-329 (2008) available from <http://dl.acm.org/citation.cfm?id=1509533>.*

Grossar, Evelyn, et al. "Read Stability and Write-Ability Analysis of SRAM Cells for Nanometer Technologies" IEEE J. of Solid-State Circuits, vol. 41, No. 11, pp. 2577-2588 (2006).*

Du, Xiaoping & Chen, Wei "Sequential Optimization and Reliability Assessment Method for Efficient Probabilistic Design" J. Mech. Design, vol. 126, pp. 225-233 (2004).*

Shan, Songqing & Wang, G. Gary "Failure Surface Frontier for Reliability Assessment on Expensive Performance Function" J. Mech. Design, vol. 128, pp. 1227-1235 (2006).*

Khalil, DiaaEldin, et al. "Accurate Estimation of SRAM Dynamic Stability" IEEE Transactions on Very Large Scale Integration Systems, vol. 16, No. 12, pp. 1639-1647 (2008).*

* cited by examiner

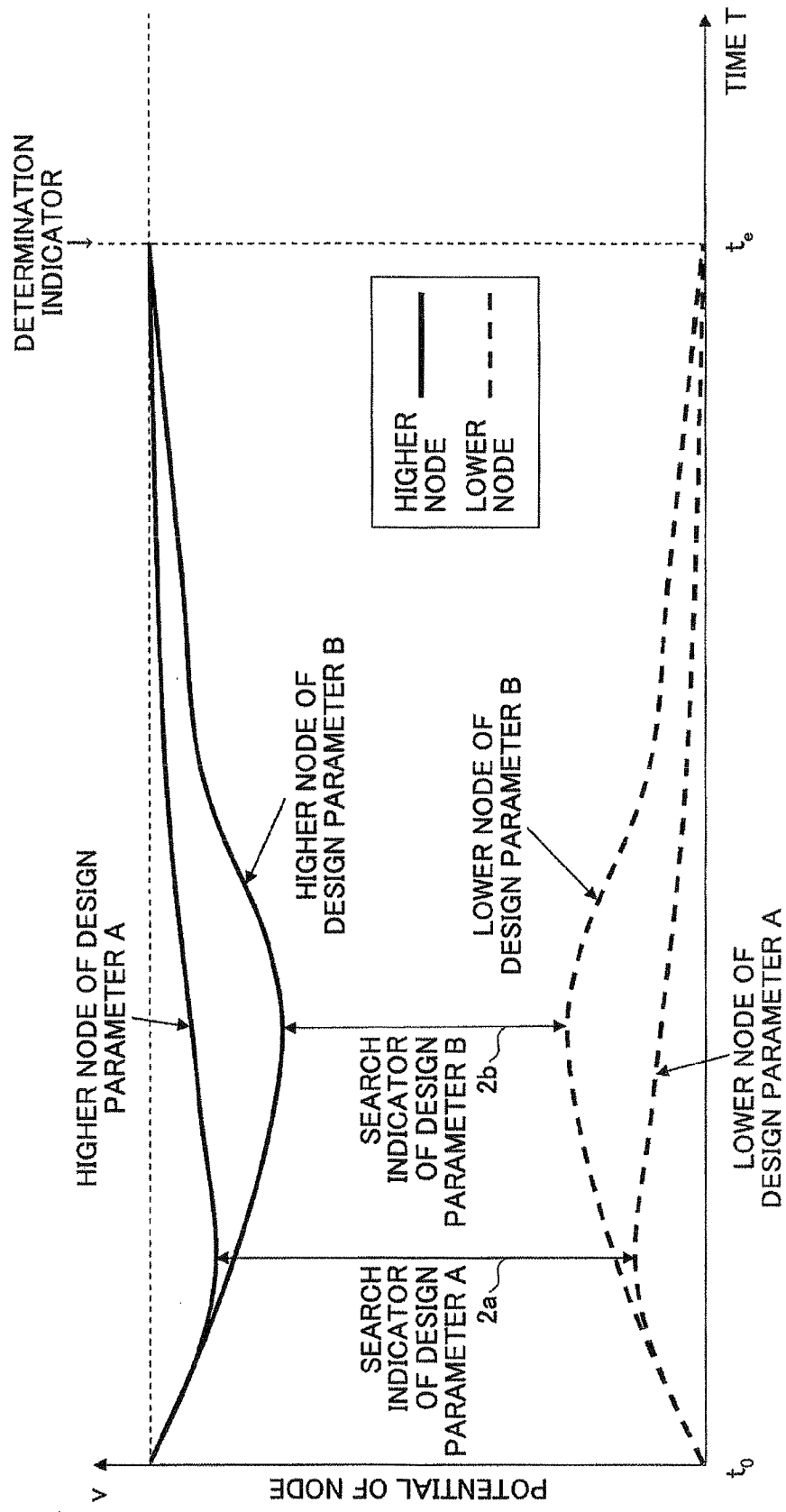

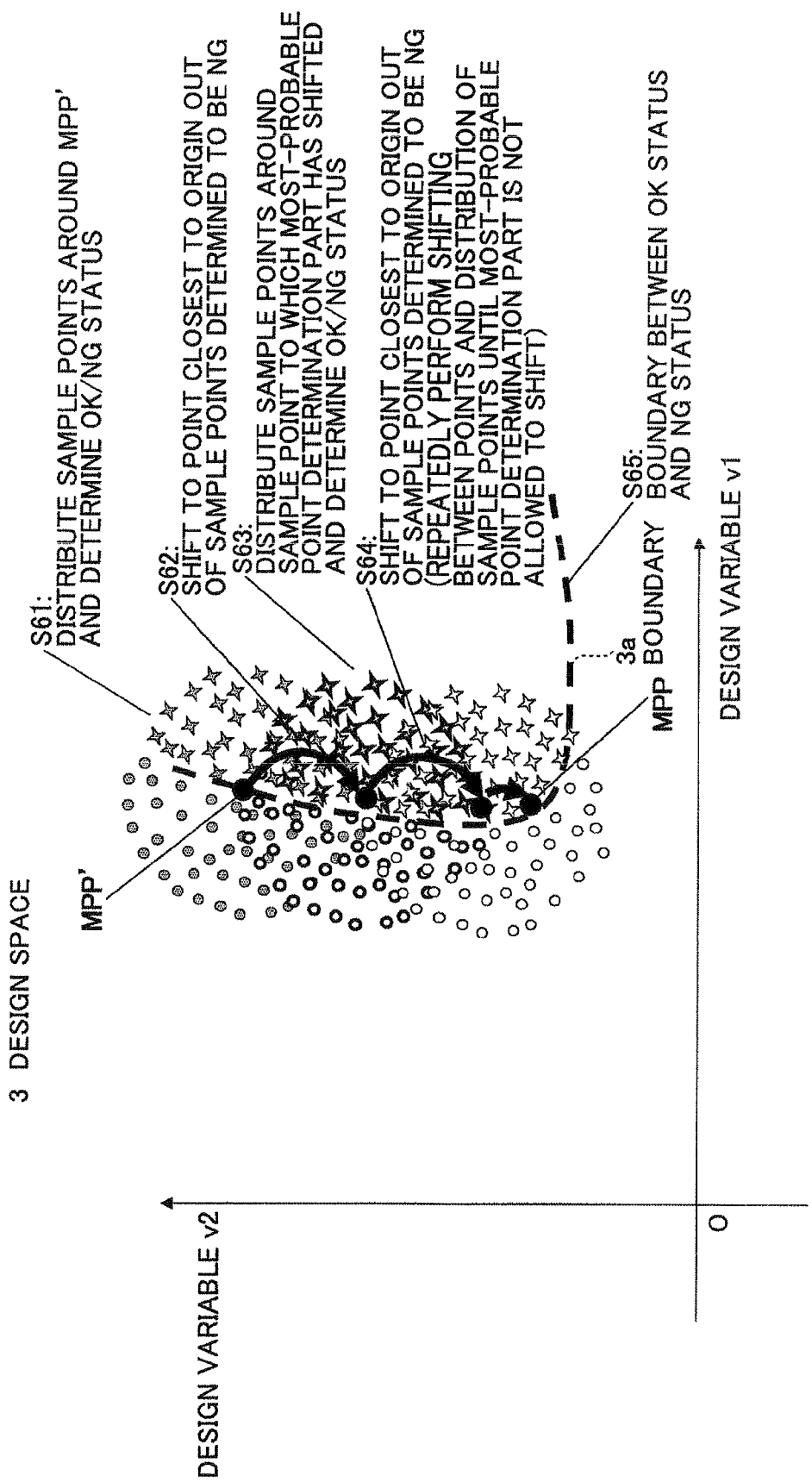

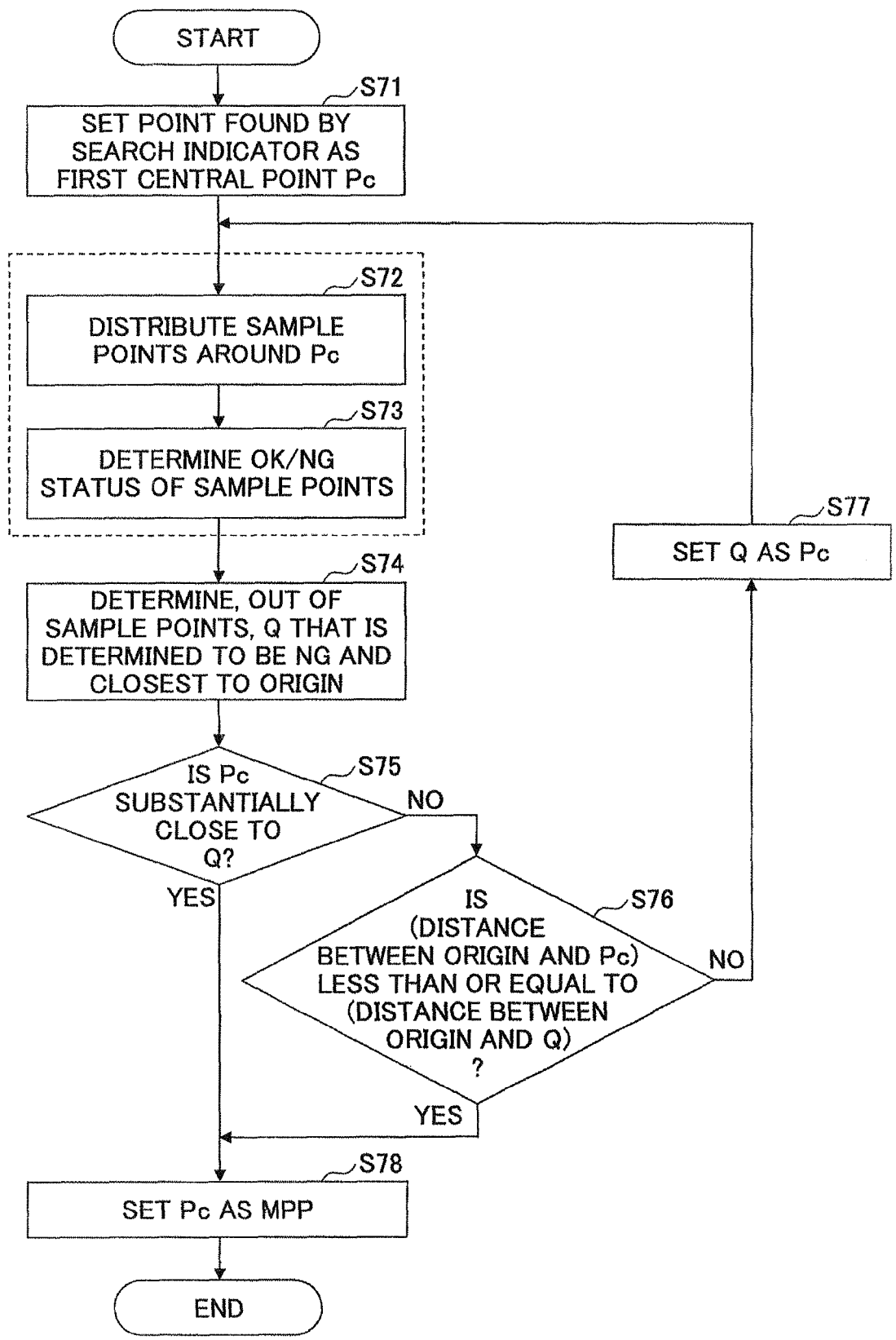

US 9,064,070 B2

INDICATOR-BASED PRODUCT DESIGN OPTIMIZATION TO FIND DEFECTIVE AND NON-DEFECTIVE STATUS

CROSS-REFERENCE TO RELATED APPLICATION

This application is based upon and claims the benefit of priority of Japanese Patent Application No. 2010-059337, filed on Mar. 16, 2010, the entire contents of which are incorporated herein by reference.

FIELD

The embodiment discussed herein is related to selecting the combination of optimum design parameters for determining event changes in the transient simulation of an event that changes with time in various ways according to the combination of the design parameters.

BACKGROUND

Up until now, there have been discussed a problem of shortening a simulation time to reduce data amounts of simulation results, and a problem of improving the convergence of a parameter value to a global solution and preventing processing time from extremely increasing in optimization using an evaluation function.
Patent Document 1: Japanese Laid-open Patent Publication No. 2003-337842
Patent Document 2: Japanese Laid-open Patent Publication No. 2007-72591

SUMMARY

According to an aspect of the present invention, there is provided a simulation method for simulating an operation of a device. The simulation method includes specifying, by a computer, a boundary between a non-defective status and a defective status of a product in design space with a design parameter as an origin. The boundary is specified according to a search using a search indicator defined based on an operating state different from an operating state of a determination indicator that determines the non-defective status and the defective status of the operation.

The object and advantages of the present invention will be realized and attained by means of the elements and combinations particularly pointed out in the claims.

It is to be understood that both the foregoing general description and the following detailed description are exemplary and explanatory and are not restrictive of the present invention, as claimed.

BRIEF DESCRIPTION OF DRAWINGS

FIG. 2 is a diagram illustrating an example of statuses in the transient simulations of two design parameters;
FIG. 17 is a diagram for illustrating a method for determining a most-probable point based on a boundary point by a Monte Carlo simulation;
and
FIG. 18 is a flowchart of processing for determining a most-probable point based on a determination indicator performed by a most-probable point determination part.

DESCRIPTION OF EMBODIMENTS

Figure 1A:
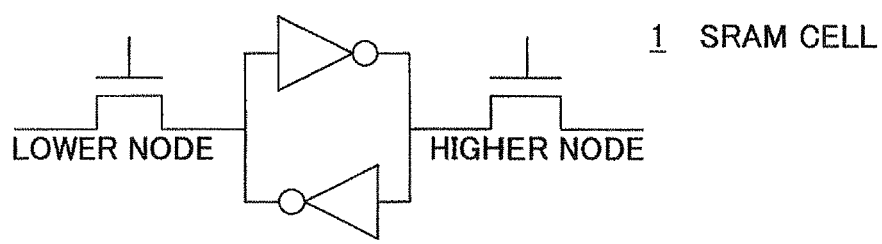
FIGS. 1A through 1C are diagrams for illustrating an example in which the statuses of a SRAM cell at the end time of a transient simulation are used as determination indicators.

In order to determine the propriety of a design using multiple design parameters, for example, in a circuit design, an analysis step is roughly performed to confirm the basic operations of a circuit in a first simulation and then finely performed to improve simulation accuracy in a second simulation. Further, in optimization using an evaluation function, optimum value candidates are selected according to the evaluation function. If the optimum value candidates are adequately obtained, initial values are determined from the optimum value candidates included in a partial set of the optimum value candidates and optimization convergence computation is performed to calculate the optimum values of parameters. Thus, the convergence of the parameter values to a global solution is improved (see, for example, Patent Documents 1 and 2).

In order to search for design parameters meeting some requirements set at the time of designing, if it is possible to set indicators expressing a degree of meeting the requirements and a degree of not meeting the requirements, the design parameters meeting the set requirements are found according to changes in the values of the indicators where the design parameters are changed. That is, when two design parameters are compared with each other using indicators, the comparison between the parameters is made based on the premise of which one of the two design parameters more closely meets requirements. In this case, for example, a steepest descent method is used to search for the design parameters meeting the requirements.

However, as design targets become complicated and prerequisites are changed, accuracy of conventional indicators capable of expressing a degree of meeting requirements has become insufficient. Further, new indicators replacing the conventional indicators cannot be easily found. It is possible to determine the propriety of a design according to the operations of SRAMs, robots, airplanes, etc., or the simulations of their operations. However, if two or more design parameters are determined to be defective or not defective by determination indicators, it is not possible to specify which design parameters are better or worse. Therefore, design space cannot be searched for according to the steepest descent method, etc., and thus a boundary defining propriety in the design space cannot be specified.

Further, where the number of design parameters is small or the ranges of the design parameters are small even if indicators cannot be set, it is possible to specify the regions showing the propriety of a design using a conventional method. This method includes, at first, simulating all possible design parameters or dividing design space by appropriate meshes to specify the meshes meeting design requirements according to results simulated using the design parameters representing the meshes; and then specifically performing a search in the ranges of the meshes. However, in the fields of SRAMs, robots, airplanes, etc., demanding high performance that allows for a variation of 6 σ, many design parameters exist and the ranges of the design parameters are large. Therefore, design space becomes large, and simulations are hard to be implemented.

A disclosed technology pertains to a simulation method that simulates the operations of a device or a circuit, and is configured such that a computer performs a boundary specification step in which a boundary defining the propriety of a product in design space using any design parameter as an origin is searched for according to a search indicator defined based on an operating status different from that of a determination indicator that determines the propriety of the operations.

Further, a disclosed simulation method is capable of being implemented by a program that causes a computer to execute the above step, a non-transitory computer readable recording medium having the program recorded therein, and a simulation device according to circuit design in which the above step is executed according to the program.

Next, referring to the accompanying drawings, a description is made of an embodiment of the present invention. This embodiment refers to a simulation method that uses plural design parameters and determines an OK/NG (non-defective/defective) status by performing experiments or simulations at respective points in design space so as to design, for example, a SRAM (Static Random Access Memory). The simulation method specifies the design parameters according to the combinations of the values of plural design variables on a boundary between a region expressing an OK status and a region expressing an NG status in the design space.

Figure 1B:
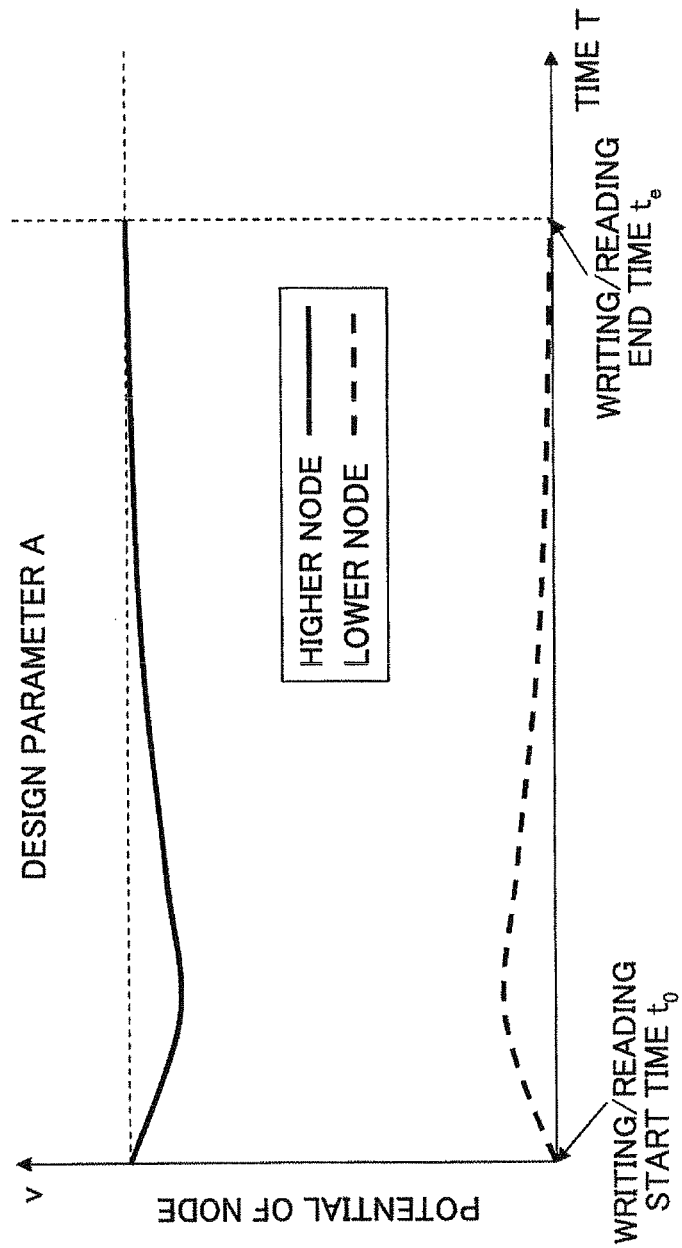
Figure 1C:
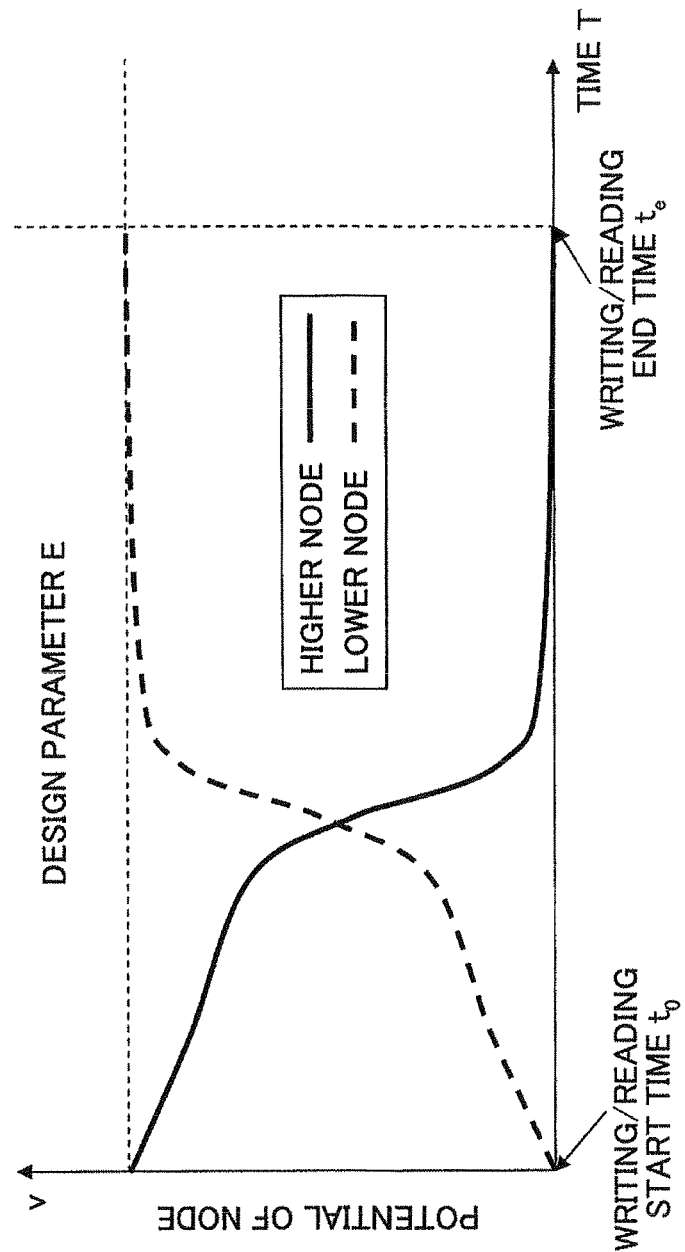

First, referring to FIGS. 1A through 1C, a description is made of a case in which the results of a transient simulation based on the operations of a SRAM are used as determination indicators. FIGS. 1A through 1C are diagrams for illustrating an example in which the statuses of a SRAM cell at the end time of the transient simulation are used as the determination indicators.

Based on the logical circuit data of the SRAM cell 1 illustrated in FIG. 1A, a simulation is performed according to the plural design parameters of the SRAM cell 1, using as the determination indicators the fact whether information in the SRAM cell 1 is held as it is (=OK: non-defective status) or rewritten (=NG: defective status) at the end time in the transient simulation from a writing/reading start time to the writing/reading end time. For example, the results of the simulations according to a design parameter A and a design parameter E are illustrated in FIGS. 1B and 1C, respectively.

In FIGS. 1B and 1C, a vertical axis on the left side illustrates the potentials of the nodes, and a horizontal axis illustrates time T. A determination is made based on the determination indicators using the potentials at the writing/reading end time $t_e$. FIG. 1B illustrates an example in which, in the case of the simulation using the design parameter A, the higher node holds its potential, which was held at the writing/reading start time $t_0$, even at the writing/reading end time $t_e$ and a determination result based on the determination indicator is OK. FIG. 1C illustrates an example in which, in the case of the simulation using the design parameter E, the higher node rewrites the potential of the node, which was held at the writing/reading start time $t_0$, at the writing/reading end time $t_e$, and a determination result based on the determination indicator is NG.

In the design parameter A and the design parameter E, it is clear from FIG. 1B and FIG. 1C that the determination results are OK and NG, respectively. However, in the simulation using, as the determination indicator, the fact whether information in the SRAM cell 1 is held as it is at the end time, if two or more design parameters with respect to the SRAM cell 1 are determined to be OK, it is not possible to determine which one of the design parameters is a better design value.

FIG. 2 is a diagram illustrating an example of statuses in the transient simulations of two design parameters. As illustrated in FIG. 2, a design parameter A and a design parameter B are determined to be OK at end time $t_e$. However, it is clear from FIG. 2 that the design parameter A and the design parameter B trace different paths with time.

In a simulation using, as a determination indicator, two statuses as to whether data can be held as they are, this embodiment sets and uses another indicator different from the determination indicator, thereby making it possible to perform comparison between design parameters determined to be OK (or NG) by the determination indicator. The other indicator different from the determination indicator is hereinafter referred to as a search indicator.

For example, in FIG. 2, with the minimum value of a potential difference between the lower node and the higher node of the SRAM cell 1 set as the search indicator in the transient simulation from start time $t_0$ to the end time $t_e$, it is possible to perform comparison between the design parameter A and the design parameter B. In this example, since a search indicator 2a indicating a potential difference between the nodes of the design parameter A is greater than a search indicator 2b indicating a potential difference between the nodes of the design parameter B, it can be determined that the design parameter A is superior to the design parameter B. On the other hand, it can be confirmed that the parameter B is closer to a boundary between an OK region and an NG region described below in design space.

Similarly, if two or more design parameters are determined to be NG by a determination indicator, comparison using a search indicator makes it possible to determine which one of the design parameters is superior in an NG region.

Figure 3:
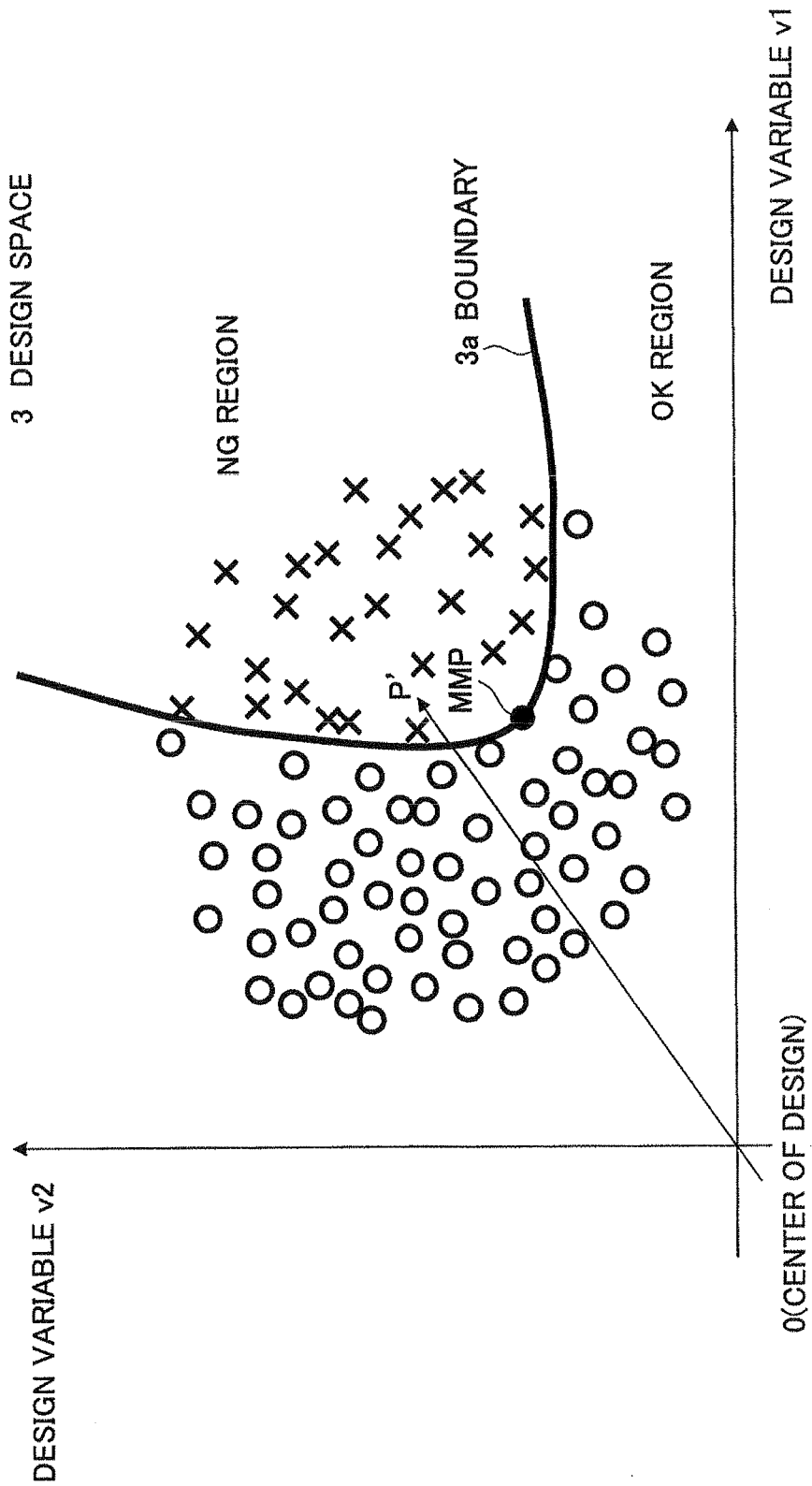
FIG. 3 is a diagram illustrating an example of design space.

Referring to FIG. 3, a description is made of a boundary between an OK region and an NG region in design space. FIG. 3 is a diagram illustrating an example of the design space. In FIG. 3, a design space 3 constructed by two design variables v1 and v2 is illustrated. In an actual design, however, multi-dimensional design space constructed by 10 through 30 design variables or more than 30 design variables is used. The combinations of the values of the plural design variables (v1, v2, , , ), i.e., coordinates representing the positions of points in the design space are indicated as respective design parameters.

An origin corresponds to the center of a design, a region allowing for a variation of, for example, 6 σ is the OK region, and a region where errors or problems occur is the NG region. On a boundary 3a between the OK region and the NG region, the point MPP closest to the center of the design is searched.

Figure 4:
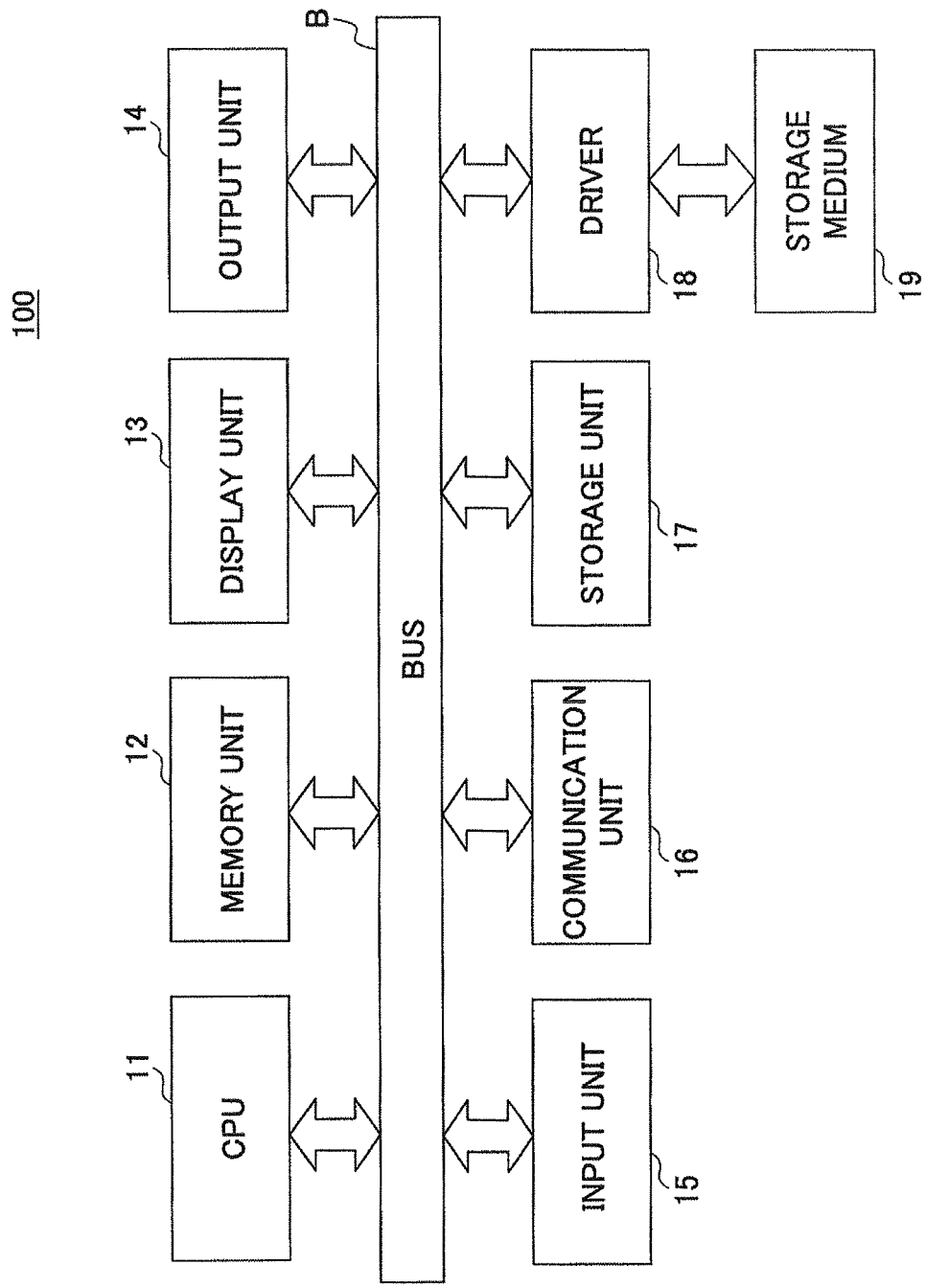
FIG. 4 is a block diagram illustrating the hardware, configuration of a simulation device.

A simulation device 100 that searches for the point P closest to the center of the design on the boundary 3a has a hardware configuration, for example, as illustrated in FIG. 4. FIG. 4 is a block diagram illustrating the hardware configuration of the simulation device.

As illustrated in FIG. 4, the simulation device 100 is a device controlled by a computer and has a CPU (Central Processing Unit) 11, a memory 12, a display unit 13, an output unit 14, an input unit 15, a communication unit 16, a storage unit 17, and a driver 18, each of which is connected to a system bus B.

The CPU 11 controls the simulation device 100 in accordance with a program stored in the memory unit 12. The memory unit 12 includes a RAM (Random Access Memory), a ROM (Read-Only Memory), and the like, and stores a program executed by the CPU 11, data necessary for processing in the CPU 11, data obtained by the processing in the CPU 11, and the like. Further, a part of the memory unit 12 is allocated as a work area for the processing in the CPU 11.

The display unit 13 displays various necessary information items under the control of the CPU 11. The output unit 14 includes a printer and the like, and is used for outputting various information items in response to instructions by the user. The input unit 15 includes a mouse, a keyboard, and the like, and is used when the user inputs various information items to perform processing with the simulation device 100. The communication unit 16 is a unit that is connected to, for example, the Internet, a LAN (Local Area Network), or the like, and performs communication control with external devices. The storage unit 17 includes, for example, a hard disk unit, and stores data such as a program for executing various processing steps.

A program for implementing the processing by the simulation device 100 is provided in the simulation device 100 by means of a storage medium 19 such as a CD-ROM (Compact Disc Read-Only Memory). In other words, when the storage medium 19 storing the program is set in a driver 18, the driver 18 reads the program from the storage medium 19 and the read program is installed in the storage unit 17 through the system bus B. Then, when the program is started, the CPU 11 starts the processing in accordance with the program installed in the storage unit 17. Note that the medium storing the program is not limited to a CD-ROM but may be any computer readable recording medium. A program that implements the processing according to the embodiment may be downloaded by the communication unit 16 through a network and installed in the storage unit 17. Further, if the simulation device 100 is of a type that supports USB, it may be installed from USB-connectable external storage units. Moreover, if the simulation device 100 is of a type that supports a flash memory such as a SD card, it may be installed from such a memory card.

Figure 5:
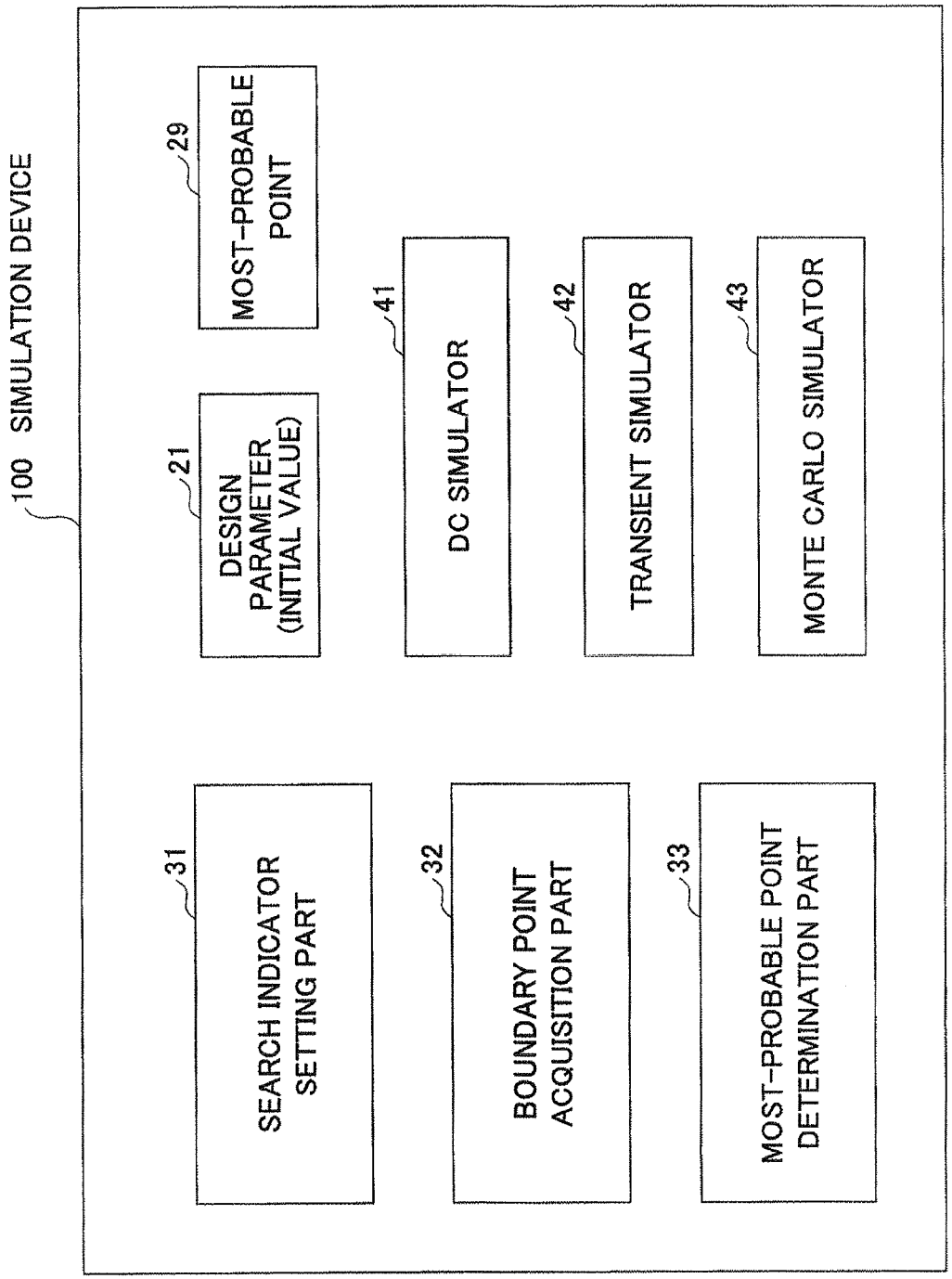
FIG. 5 is a diagram illustrating a function configuration example of the simulation device.

FIG. 5 is a diagram illustrating a function configuration example of the simulation device. As illustrated in FIG. 5, the simulation device 100 functions, when the CPU 11 performs the program, as the respective processing parts of a search indicator setting part 31, a boundary point acquisition part 32, a most-probable point determination part 33, a DC (direct current) simulator 41, a transient simulator 42, and a Monte Carlo simulator 43. A design parameter 21 is stored in advance in the storage region of the memory unit 12 or the storage unit 17 (hereinafter simply referred to as a storage region) as an initial value, and a most-probable point 29 is output to the storage region by the processing of the CPU 11.

The search indicator setting part 31 is a processing part that sets a search indicator different from a determination indicator. The search indicator is an indicator that makes it possible to perform comparison between setting parameters even when the comparison cannot be performed by the determination indicator. While the determination indicator determines whether a design is defective or non-defective by an operating simulation, the search indicator verifies statuses relating to stability, superiority/inferiority, or the like of the designed SRAM cell 1 and performs comparison between the design parameters so as to determine which one of the parameters is superior/inferior.

The boundary point acquisition part 32 is a processing part that performs comparison between parameters using a search indicator to acquire any point (hereinafter referred to as a boundary point) on the boundary 3a illustrated in FIG. 3. The boundary point acquisition part 32 employs, for example, a steepest descent method or the like based on the search indicator obtained by executing the DC simulator 41 or the transient simulator 42.

The most-probable point determination part 33 is a processing part that performs a simulation based on a determination indicator by providing variation distribution for distributing sample points around a boundary point obtained by the boundary point acquisition part 32 in accordance with normal distribution so as to find a point MPP' closest to the center of a design on or near the boundary 3a. The most-probable point determination part 33 repeatedly performs the simulation around the point MPP' and outputs, as a most-probable point 29 of the storage region, the point converged upon as the point closest to the center of the design on or near the boundary 3a. For example, the most-probable point determination part 33 provides a variation distribution in accordance with a central point to the Monte Carlo simulator 43 so as to perform the simulation. To this end, a method for generating lattice points or the like may be employed so long as it is a method for searching the center of the boundary point. Further, since the point closest to the center of a design is important for yield calculation, the most-probable point determination part 33 searches for a point closer to an origin. In order to optimize the design, however, the most-probable point determination part 33 may perform a search in such a manner that another performance indicator different from a determination indicator and the search indicator is employed and points meeting the determination indicator and showing the best performance indicator are repeatedly found around a start point.

The DC simulator 41 is a simulator that evaluates stability based on the size of the SNM (Static Noise Margin) of the SRAM cell 1 using the logical circuit data of the SRAM cell 1. The DC simulator 41 analyzes the characteristics of the SRAM cell 1 using a SPICE (Simulation Program with Integrated Circuit Emphasis) simulator and acquires a margin as the value of a search indicator from an analysis result.

The transient simulator 42 is a simulator that provides a design parameter to the logical circuit data of the SRAM cell 1 to evaluate the operations of the SRAM cell 1 along with a time axis.

The Monte Carlo simulator 43 performs a simulation using sample values based on variation distribution in a predetermined range according to a provided design parameter, and outputs a determination result based on the determination indicator.

Figure 6:
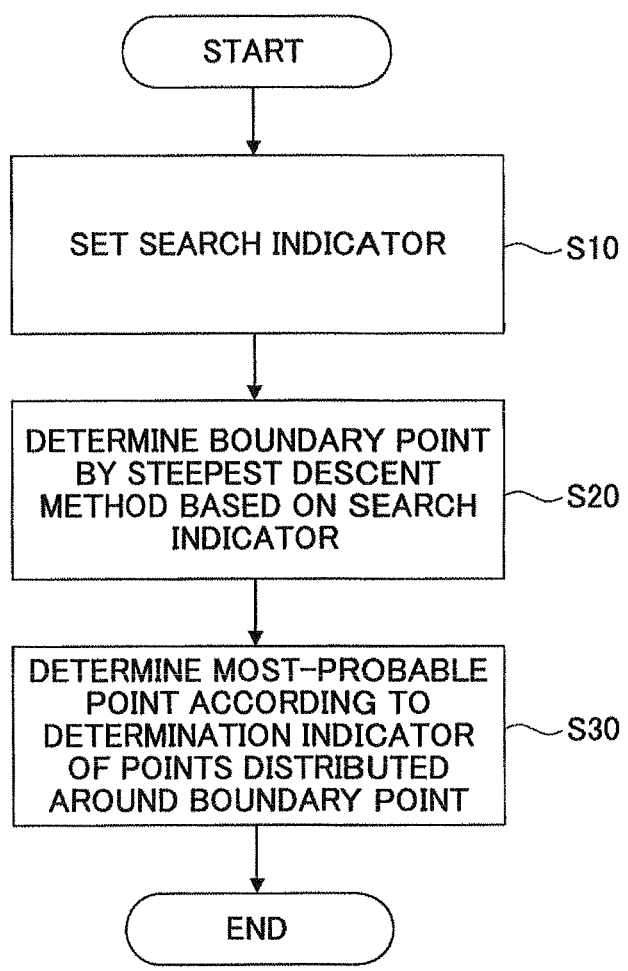
FIG. 6 is a diagram for illustrating the entirety of processing for specifying a boundary between a non-defective status and a defective status in the design space.

FIG. 6 is a diagram for illustrating the entirety of processing for specifying a boundary between a non-defective status and a defective status in design space. In FIG. 6, in the simulation device 100, the search indicator setting part 31 sets a search indicator (step S10). For example, a screen for causing the user to input the search indicator is displayed on the display unit 13. The user may be caused to select the DC simulator or the transient simulator 42 depending on the screen displayed.

If the DC simulator 41 is selected, the size of the SNM indicating the stability of the SRAM cell 1 is set as the search indicator. If the transient simulator 42 is selected, it is set so that any of the various search indicators described below is selectable. In this case, search items such as a voltage and a current, search standard values such as a maximum value, a minimum value, and a difference, and plural setting items such as a search time may be set as the search indicators. These setting items are set for evaluating superiority/inferiority in the operations of the SRAM cell 1.

In the simulation device 100, the boundary point acquisition part 32 determines a boundary point according to the steepest descent method based on the search indicator. The boundary point acquisition part 32 determines a search point at which the search indicator is the closest to zero using the steepest descent method based on the search indicator in a predetermined range from an origin in the design space 3 in which the design parameter 21 stored in advance in a storage region is used as the origin; and repeatedly determines a next search point using the steepest descent method based on the search indicator so as to acquire any boundary point on the boundary 3a.

In the simulation device 100, the most-probable point determination part 33 determines a most-probable point according to the determination indicator of the respective sample points distributed around the boundary point acquired by the boundary point acquisition part 32 based on the variation distribution (step S30). The most-probable point determination part 33 performs the Monte Carlo simulator 43 to determine the most-probable point and stores it in the storage region as a most-probable point 29.

Figure 7:
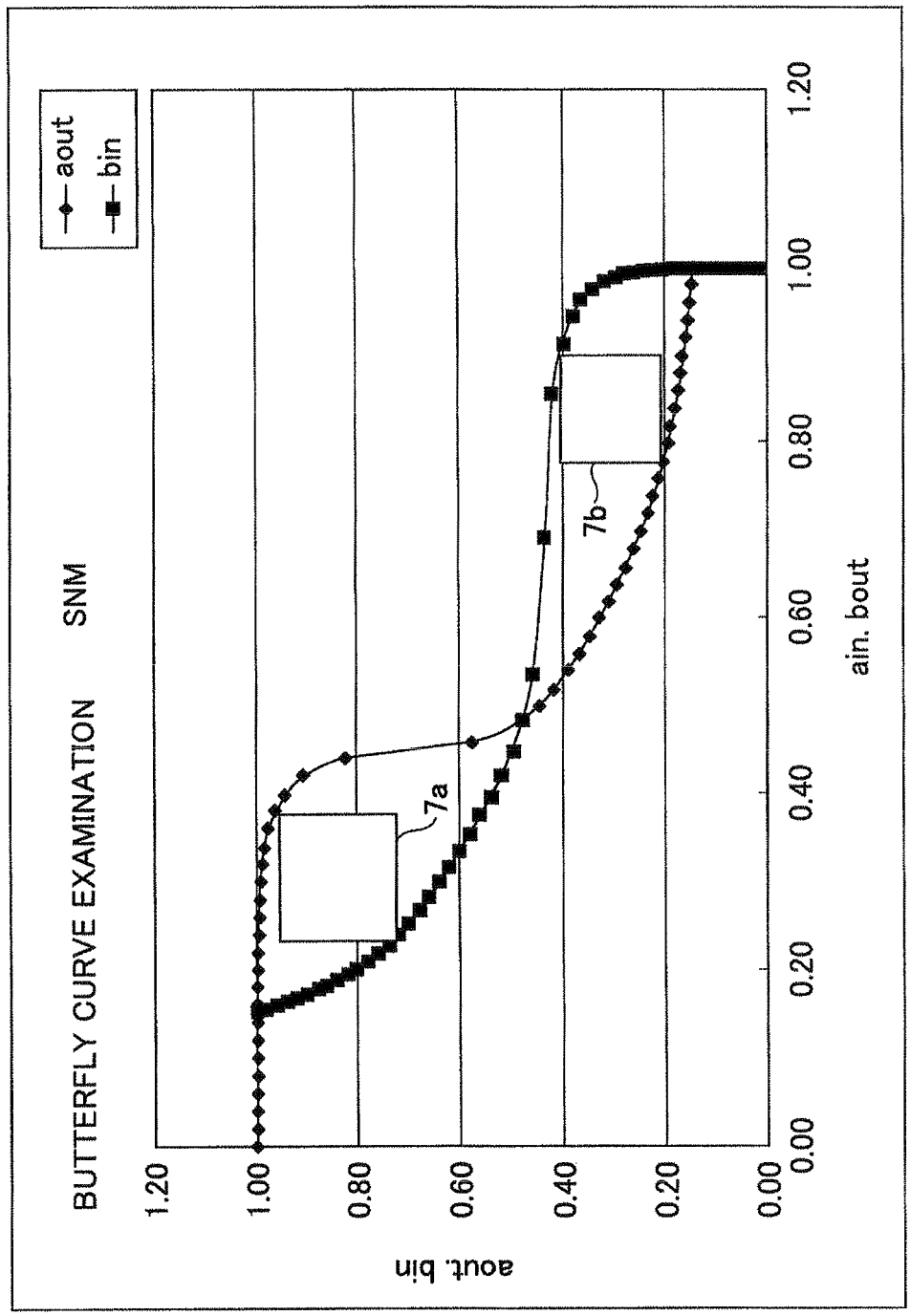
FIG. 7 is a diagram illustrating an example in which a DC (direct current) simulation result is used as the determination indicator.

Next, a determination indicator is described. Referring to FIG. 7, a description is first made of an example in which a DC simulation result by the DC simulator 41 is used as the determination indicator. FIG. 7 is a diagram illustrating the example in which the DC simulation result is used as the determination indicator. When the two nodes of the SRAM cell 1 are separated and the voltage characteristics of the inputs and outputs of the two nodes are independently simulated by the DC simulator 41, the DC simulation result, for example, as illustrated in FIG. 7 is obtained. In FIG. 7, two squares 7a and 7b represent the sizes of the SNM. If the length of the diagonal line of the smaller square is used as the search indicator and a search is performed from the OK region to the NG region illustrated in FIG. 3, a setting parameter having a smaller search indicator among those in a predetermined range is a search point.

As an example to which the SNM is applied, it is assumed to use an indicator U in which a search indicator and the determination indicator are combined. In processing using a pseudo-code described below, the determination indicator returns a positive value or zero if the determination indicator is OK and returns a negative value if the determination indicator is NG. Using a numerical value a greater than the maximum value of the absolute value of the value taken by the search indicator in a search region where a search is performed from the origin to the boundary 3a in the design space 3, the following equations are provided.

U=search indicator+α (where determination indicator is greater than or equal to zero)

U=search indicator−α (where determination indicator is less than zero)

The pseudo-code is provided, for example, as follows.

```
If (determination indicator is greater than or
equal to zero) {
    U = search indicator + α
}else{
    U = search indicator − α
```

Thus, U returns a value greater than or equal to zero if the determination indicator is OK and returns a value less than zero if the determination indicator is NG. Further, if only the region where the determination indicator is OK or the region where the determination indicator is NG is searched, a steepest descent direction as in the case of a search indicator described below can be found. In this case, a value at a boundary between the OK region and the NG region disappears, but it does not cause any problems in the processing.

Next, as examples of a determination indicator using a transient simulation, a description is made, referring to FIGS. 8 through 14, of examples in which statuses at one or more predetermined times are used as search indicators. The statuses at the predetermined times refer, for example, to a voltage value, a current value, or the like. In FIGS. 8 through 14, a vertical axis on the left side represents design space, while a horizontal axis represents time. At determination time $t_d$, a determination indicator as an OK (non-defective) status or an NG (defective) status is illustrated.

Figure 8:
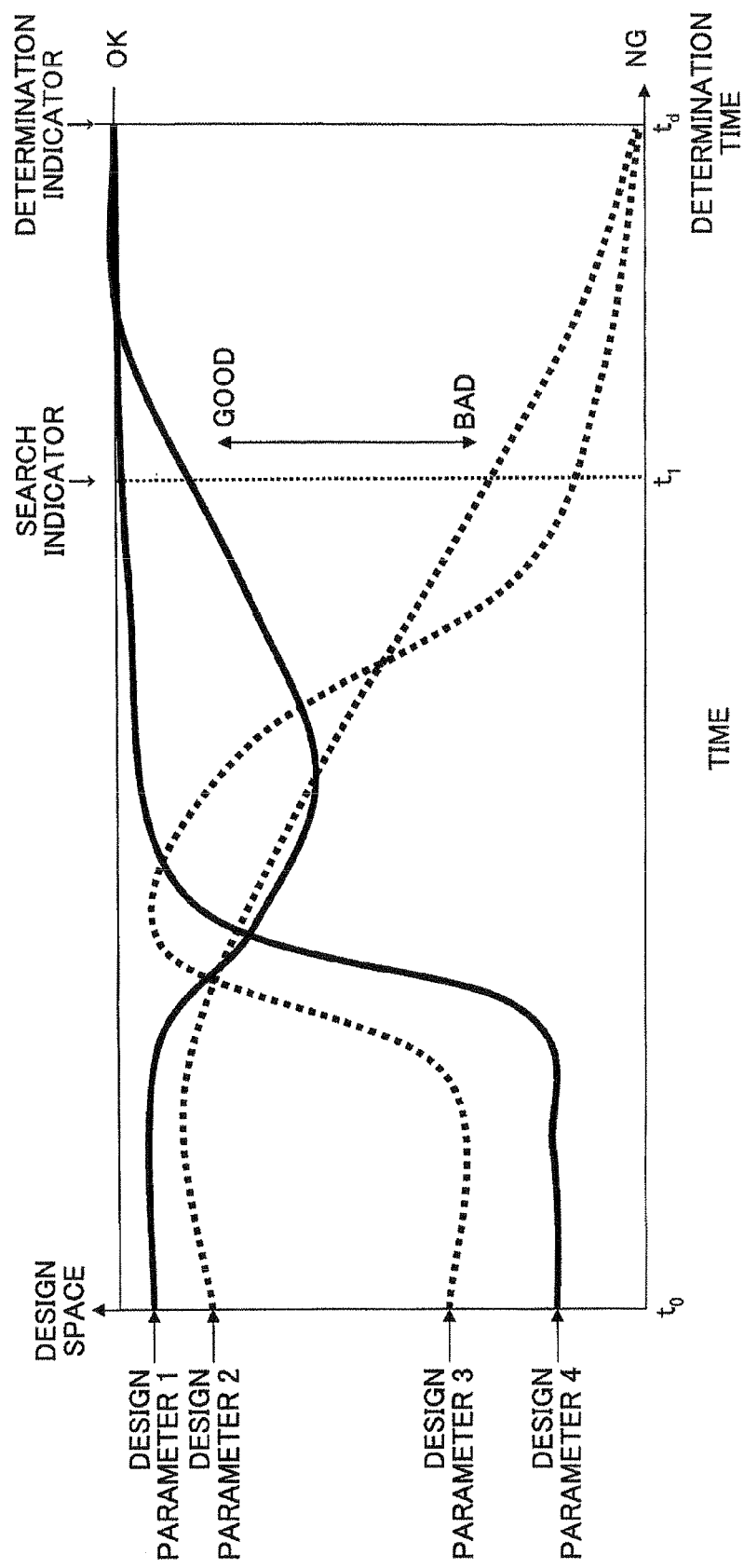
FIG. 8 is a diagram illustrating a first example in which a status at a predetermined time is used as a determination indicator.

FIG. 8 is a diagram illustrating a first example in which a status at a predetermined time is used as a determination indicator. In FIG. 8, time $t_1$ is a time set before the determination time $t_d$ and set to obtain the status of a search indicator.

In this first example, at the determination time $t_d$, a design parameter 1 and a design parameter 4 are determined to be OK by the determination indicator, while a design parameter 2 and a design parameter 3 are determined to be NG by the determination indicator. At the determination time $t_d$, a determination as to superiority/inferiority between the design parameter 1 and the design parameter 4 cannot be made. On the other hand, at the determination time $t_1$ as the search indicator, there is a difference in the statuses between the design parameter 1 and the design parameter 4. Therefore, the determination as to the superiority/inferiority between the design parameter 1 and the design parameter 4 is made possible. In this case, it is determined that the design parameter 4 is superior to the design parameter 1. Similarly, comparing the design parameter 2 with the design parameter 3, it is determined that the design parameter 3 is inferior to the design parameter 2.

As described above, with the time designated as the search indicator, the statuses at the designated time are acquired according to the result of a transient simulator and compared with each other between the design parameters. Thus, the determination as to the superiority/inferiority between the setting parameters can be made.

Figure 9:
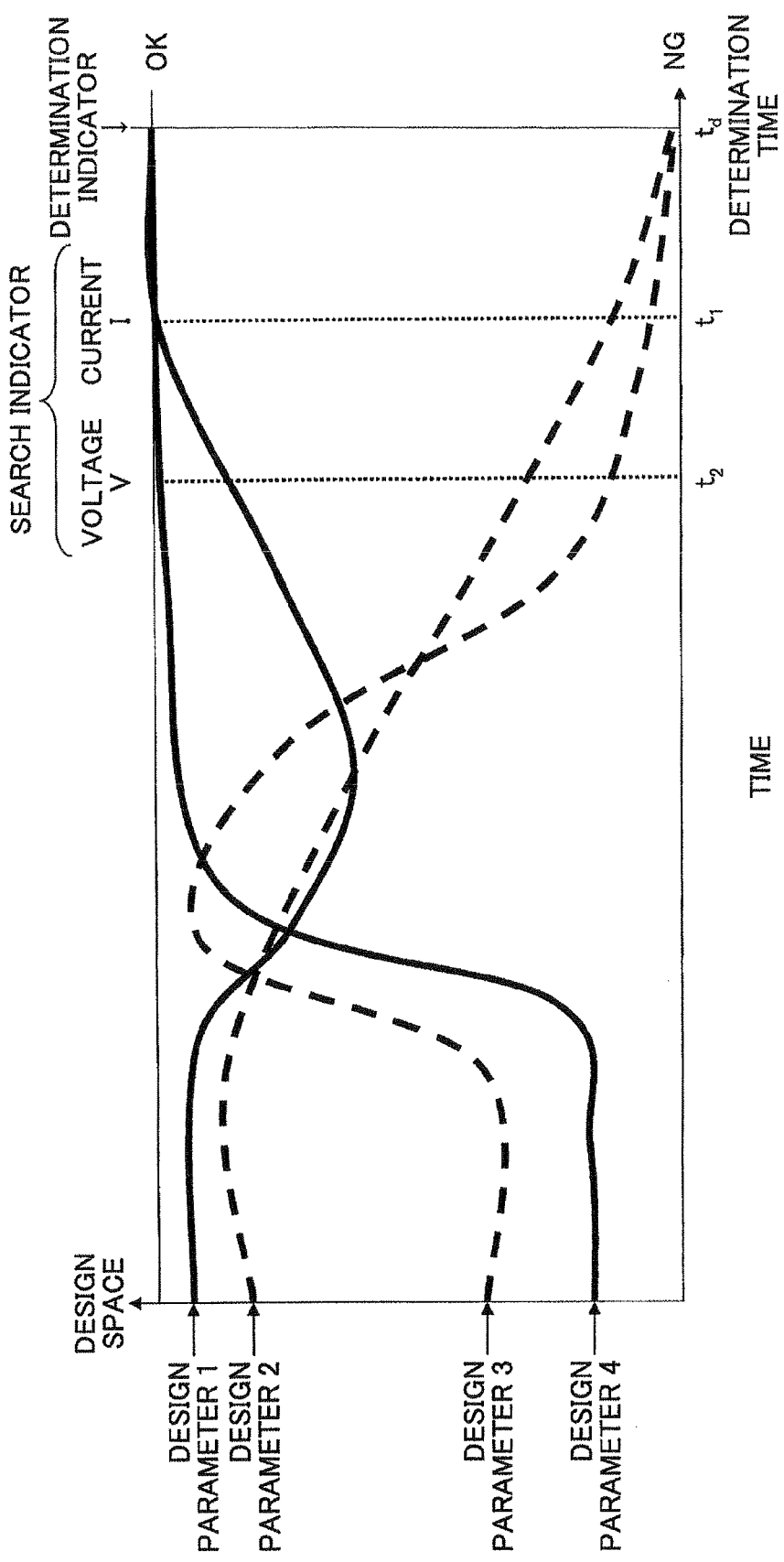
FIG. 9 is a diagram illustrating a second example in which a status at a predetermined time is used as a determination indicator.

FIG. 9 is a diagram illustrating a second example in which a status at a predetermined time is used as a determination indicator. In the second example illustrated in FIG. 9, plural search indicators are set. In FIG. 9, time $t_1$ and $t_2$ are times set before determination time $t_d$, and the time $t_2$ is set further before the time $t_1$ relative to the determination time $t_d$. Further, the statuses of the search indicators may be different from each other at the time $t_1$ and the time $t_2$.

For example, a current value is used at the time $t_1$ to determine superiority/inferiority between parameters, while a voltage value is used at the time $t_2$ to determine the superiority/inferiority. As a method for using such two search indicators, when the determination as to the superiority/inferiority cannot be made at the time $t_1$ closer to the determination time $t_d$, another value is used to make the determination at the time $t_2$.

In this second example, the determination as to the superiority/inferiority between a design parameter 1 and a design parameter 4 determined to be OK by the determination indicator cannot be made by the current value at the time $t_1$ as the search indicator. However, it is determined by the voltage value at the time $t_2$ as the search indicator that the design parameter 1 is superior to the design parameter 4. On the other hand, as to a design parameter 2 and a design parameter 3 determined to be NG by the determination indicator, it can be determined by the current value at the time $t_1$ as the first search indicator that the design parameter 3 is inferior to the design parameter 2. Therefore, comparison between the parameters at the time $t_2$ as the next search indicator may be omitted.

Figure 10:
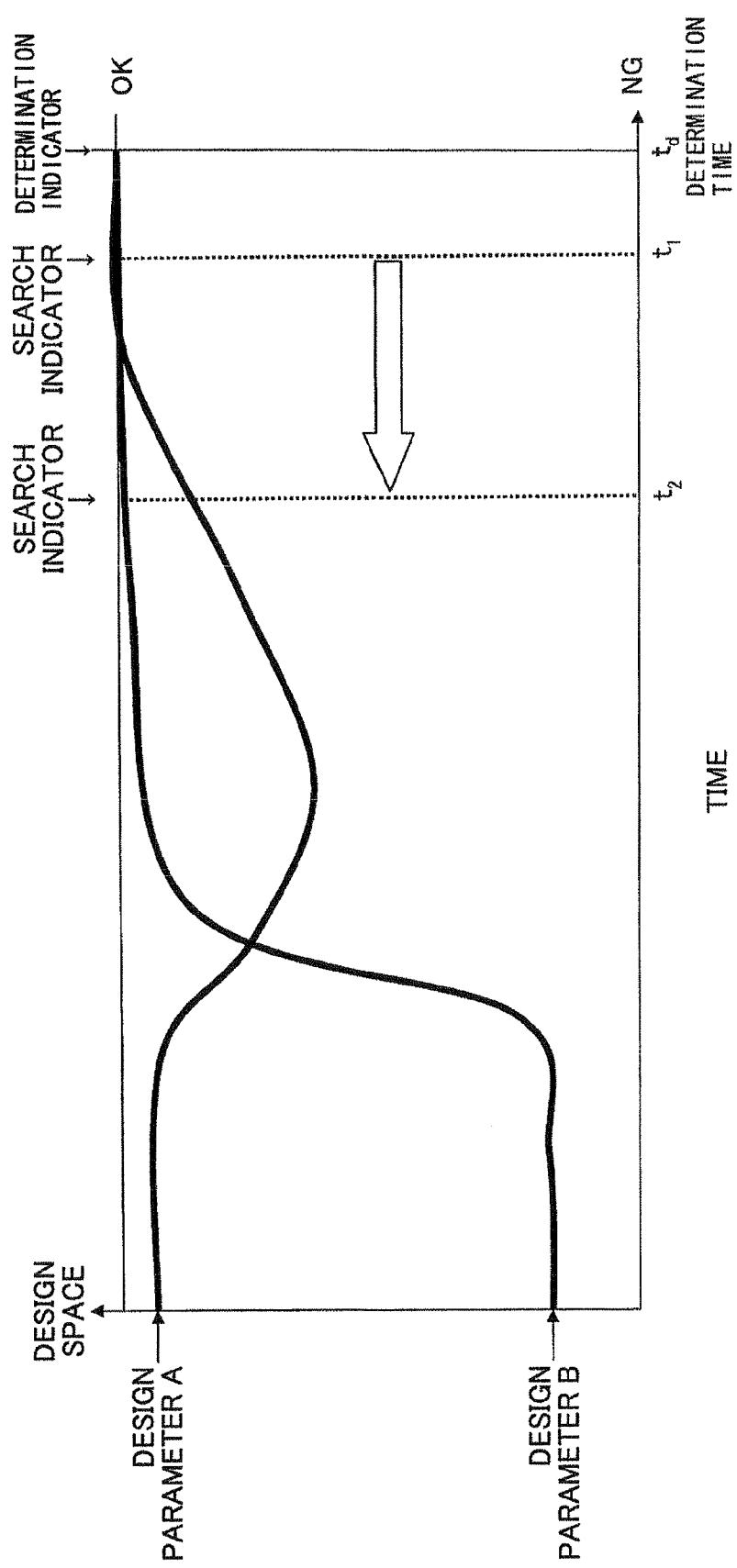
FIG. 10 is a diagram illustrating a third example in which a status at a predetermined time is used as a determination indicator.

FIG. 10 is a diagram illustrating a third example in which a status at a predetermined time is used as a determination indicator. In the third example illustrated in FIG. 10, determination as to superiority/inferiority between parameters is made in such a manner that time as a search indicator is shifted back and forth as occasion demands. In FIG. 10, times $t_1$ and $t_2$ are times set before determination time $t_d$. If the determination cannot be made at the time $t_1$, the search indicator is shifted to the time $t_2$ set further before the time $t_1$ relative to the determination time $t_d$ so as to make the determination. The determination time as the search indicator is not necessarily shifted to the past but may be shifted back and forth.

In this third example, the determination as to the superiority/inferiority between a design parameter A and a design parameter B determined to be OK by the determination indicator cannot be made at the time $t_1$ as the search indicator. However, it is determined at the time $t_2$ that the design parameter B is superior to the design parameter A.

Figure 11:
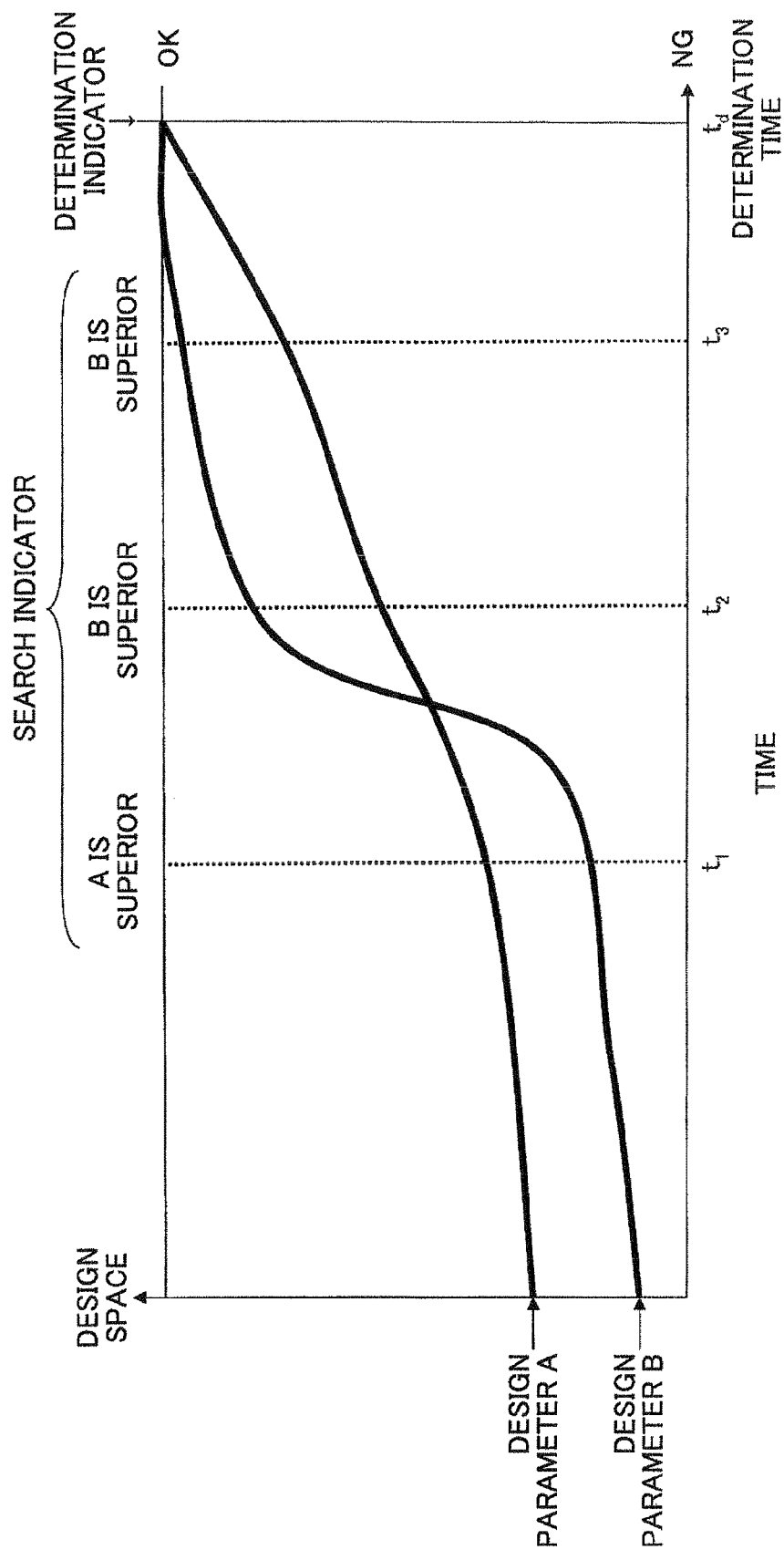
FIG. 11 is a diagram illustrating a fourth example in which a status at a predetermined time is used as a determination indicator.

FIG. 11 is a diagram illustrating a fourth example in which a status at a predetermined time is used as a determination indicator. In the fourth example illustrated in FIG. 11, search indicators are set at three or more times so as to determine superiority/inferiority between parameters, and the determination as to the superiority/inferiority between two design parameters is made based on majority rule. In FIG. 11, time $t_1$, time $t_2$, and time $t_3$ are times set before determination time $t_d$ and set with time.

In this fourth example, it is determined, by the determination as to the superiority/inferiority between a design parameter A and a design parameter B at the time $t_1$, the time $t_2$, and the time $t_3$ as the search indicators, that the design parameter A is superior at the time $t_1$, the design parameter B is superior at the time $t_2$, and the design parameter B is superior at the time $t_3$. Accordingly, since the design parameter B is more frequently determined to be superior than the design parameter A, it can be determined that the design parameter B is superior to the design parameter A.

Figure 12:
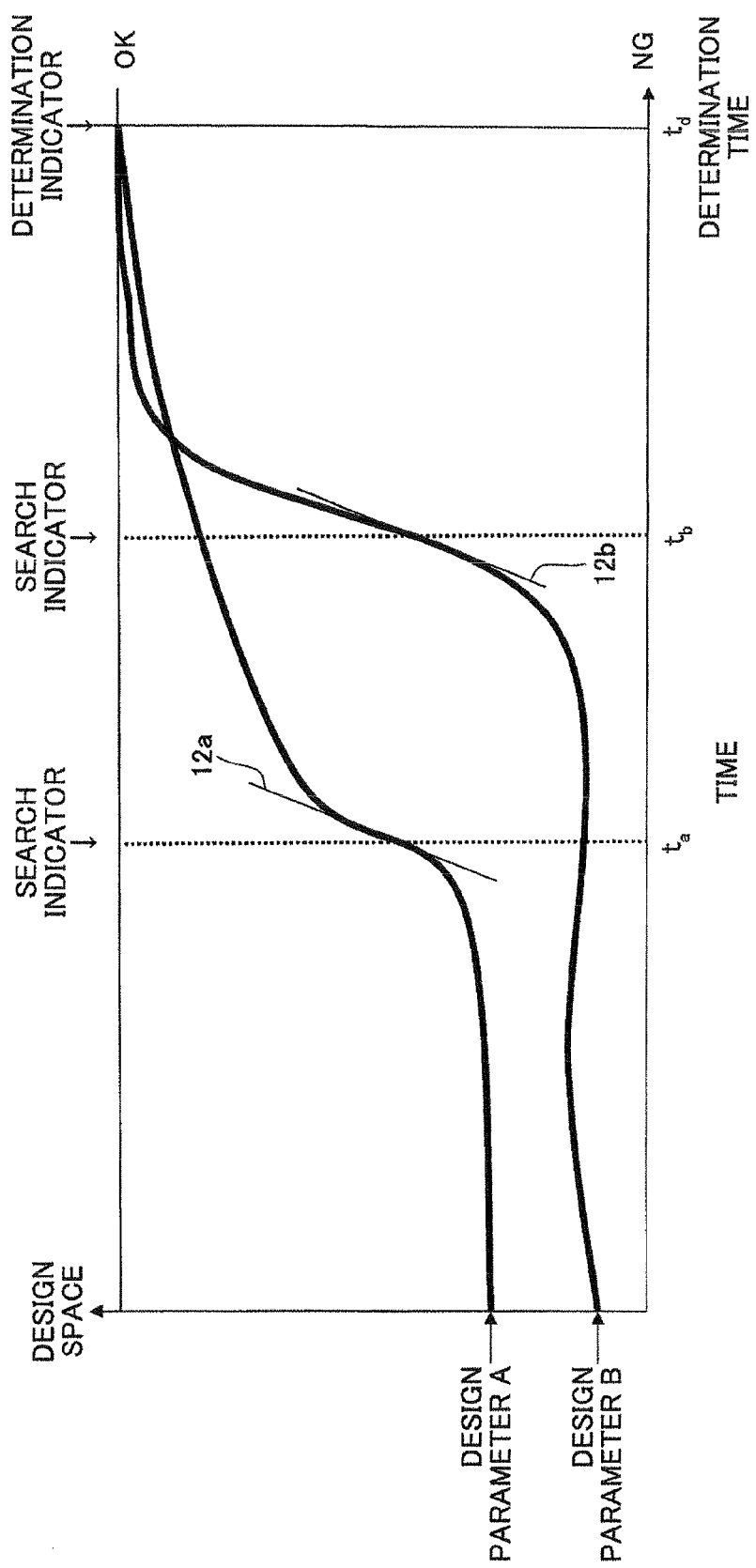
FIG. 12 is a diagram illustrating a fifth example in which a status at a predetermined time is used as a determination indicator.

FIG. 12 is a diagram illustrating a fifth example in which a status at a predetermined time is used as a determination indicator. In the fifth example illustrated in FIG. 12, a determination as to superiority/inferiority between two design parameters is made based on a time difference relative to a determination time between times at which the value of the search indicator varies above a certain level per unit time. In FIG. 12, time $t_a$ and time $t_b$ are times set before determination time $t_d$ and at which the value of the search indicator varies above a certain level per unit time in the respective design parameters.

In this fifth example, the value of the search indicator of a design parameter A varies above a certain level per unit time at the time $t_a$, while the value of the search indicator of a design parameter B varies above a certain level per unit time at the time $t_b$. Since the time $t_a$ is set before the time $t_b$ relative to the determination time $t_d$, it can be determined that the design parameter A moves to the status determined to be OK by the determination indicator earlier than the design parameter B and thus the design parameter A is superior to the design parameter B.

Figure 13:
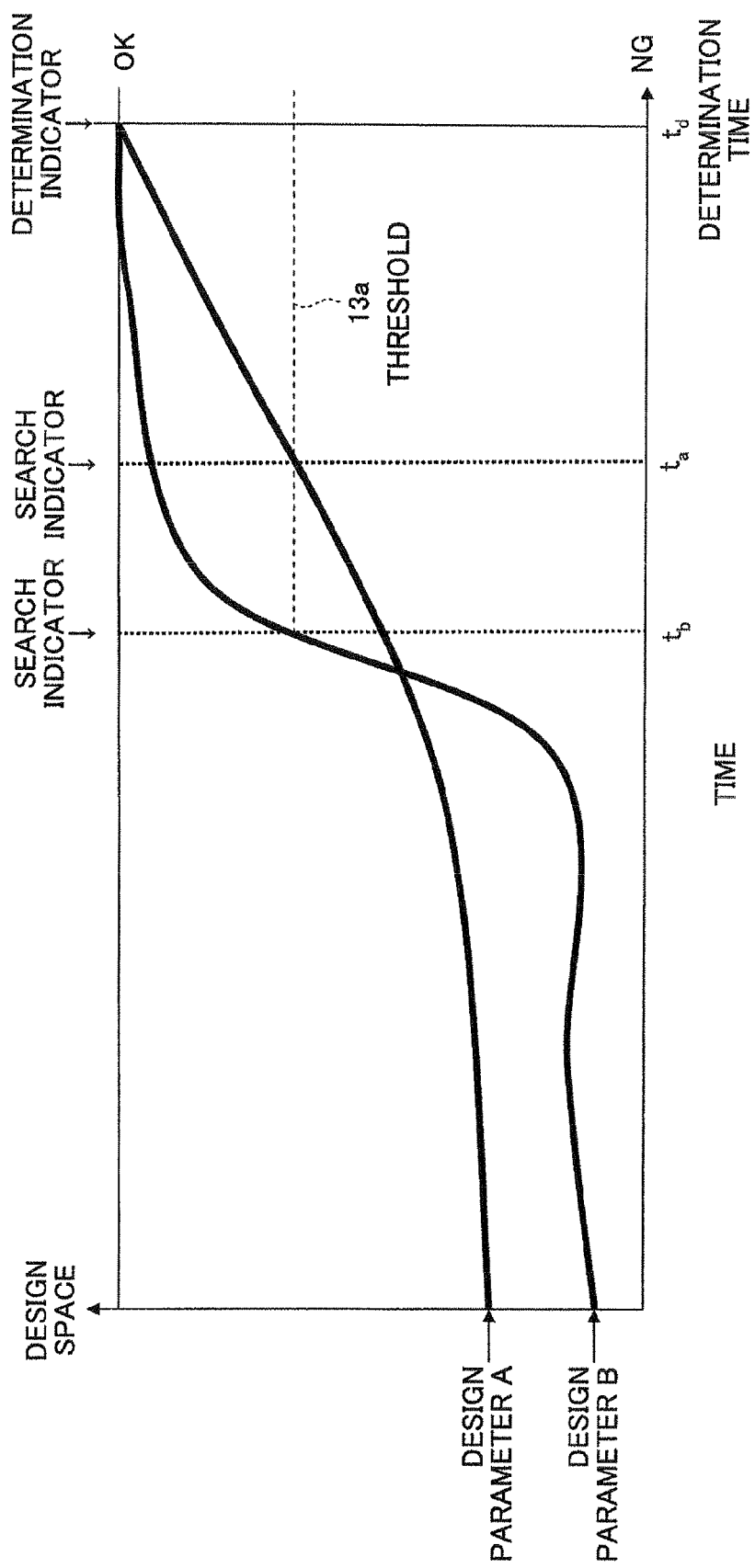
FIG. 13 is a diagram illustrating a sixth example in which a status at a predetermined time is used as a determination indicator.

FIG. 13 is a diagram illustrating a sixth example in which a status at a predetermined time is used as a determination indicator. In the sixth example illustrated in FIG. 13, a determination as to superiority/inferiority between two design parameters is made based on a timing at which the value of the search indicator exceeds a certain threshold. In FIG. 13, time $t_a$ and time $t_b$ are times set before determination time $t_d$ and at which the value of the search indicator varies above the certain threshold in the respective design parameters.

In this sixth example, the value of the search indicator of a design parameter A varies above a threshold 13a at the time $t_a$, while the value of the search indicator of a design parameter B varies above the threshold 13a at the time $t_b$. Since the time $t_b$ is set before the time $t_a$ relative to the determination time $t_d$, it can be determined that the design parameter B moves to the status determined to be OK by the determination indicator earlier than the design parameter A and thus the design parameter B is superior to the design parameter A.

Figure 14:
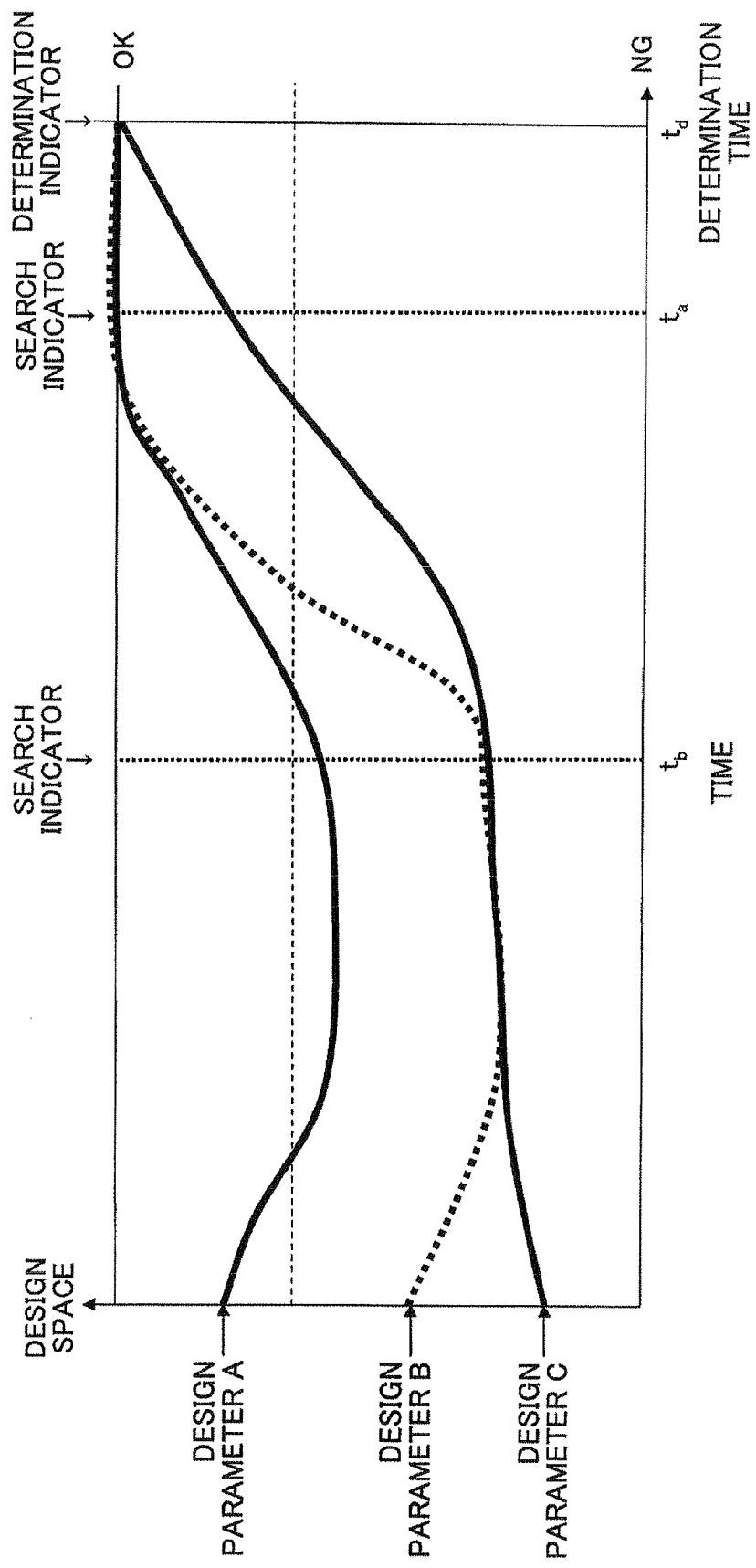
FIG. 14 is a diagram illustrating a seventh example in which a status at a predetermined time is used as a determination indicator.

FIG. 14 is a diagram illustrating a seventh example in which a status at a predetermined time is used as a determination indicator. In the seventh example illustrated in FIG. 14, plural times as search indicators are set. Let it be assumed that among three or more design parameters there are some of the design parameters for which a determination as to superiority/inferiority cannot be made at a certain time. In this case, including the determination as to the superiority/inferiority at another time, the determination as to the superiority/inferiority is made with respect to all the design parameters. In FIG. 14, time $t_a$ and time $t_b$ are times set before determination time $t_d$. If there are some of the design parameters for which the determination as to the superiority/inferiority cannot be made at the time $t_a$, the determination is made in turn at the time $t_b$ that is set before the time $t_a$ relative to the determination time $t_d$. Thus, based on determination results at both of the time $t_a$ and the time $t_b$, the determination as to the superiority/inferiority is made with respect to all the design parameters.

In this seventh example, a design parameter A and a design parameter B are superior to a design parameter C at the time $t_a$, but the determination as to the superiority/inferiority cannot be made between the design parameter A and the design parameter B. For example, a relationship as to the superiority/inferiority between the design parameters can be expressed as "A=B>C." Moreover, at the time $t_b$ set before the time $t_a$ relative to the determination time $t_d$, the design parameter A is superior to the design parameter B and the design parameter C. Here, the relationship as to the superiority/inferiority between the design parameters can be expressed as "A>B=C." Accordingly, the relationship as to the superiority/ inferiority "A>B>C" is established, and it can be determined that the design parameter A is superior to the design parameters B and C and the design parameter B is superior to the design parameter C.

It is to be noted that the example, in which the determination indicator and the search indicators are used in the transient simulation, includes not only the method for comparing the search indicators with each other using the times and the statuses at the times but also the method for using the minimum value of the potential difference in the transient simulation illustrated in FIG. 2 as the search indicator. Since this method is illustrated in detain in FIG. 2, it is omitted here.

Figure 15:
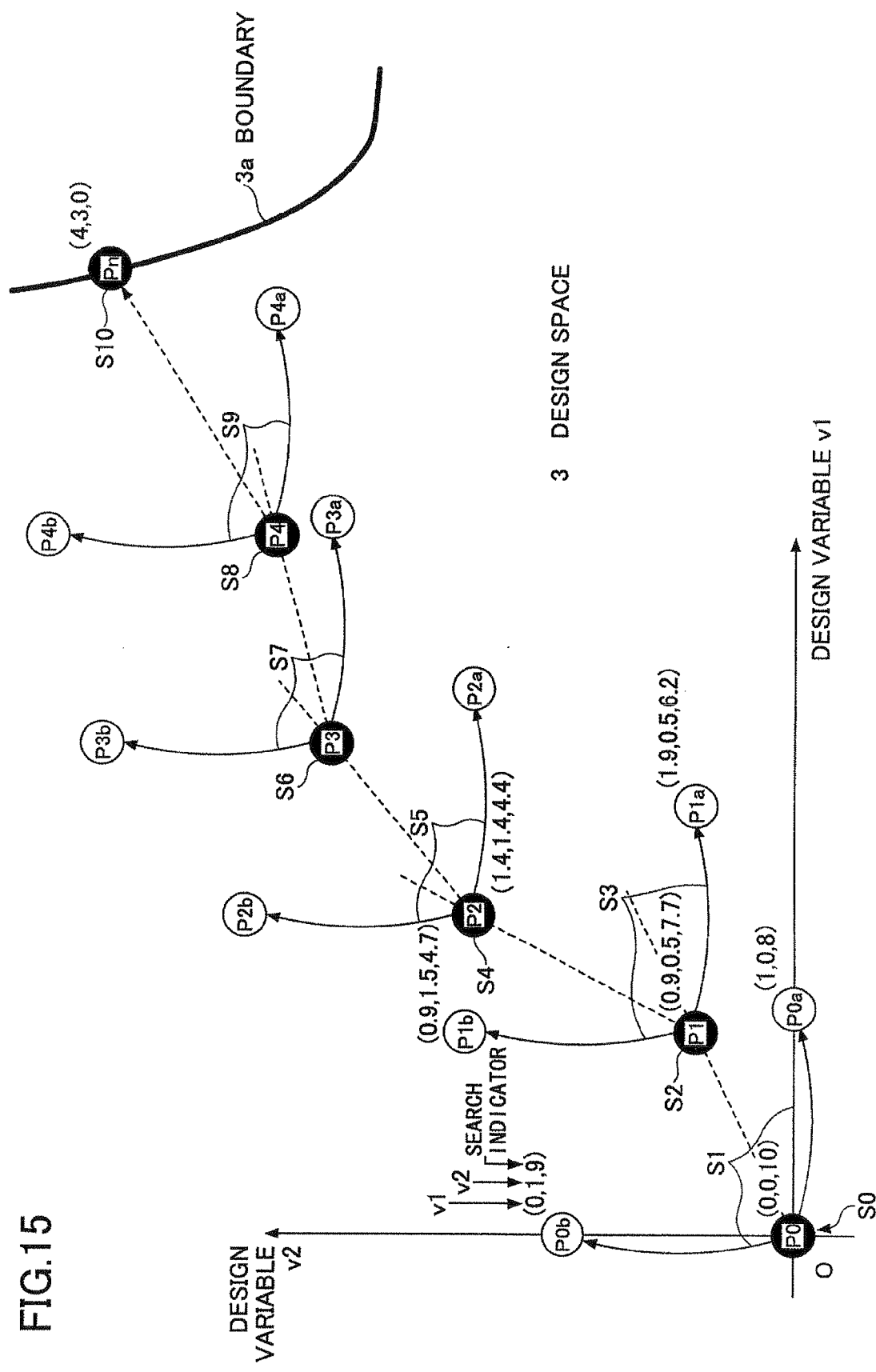
FIG. 15 is a diagram for illustrating a steepest descent method based on search indicators.

Next, in order to search for any boundary point on the boundary 3a, a description is made of a steepest descent method based on search indicators performed by the boundary point acquisition part 32. FIG. 15 is a diagram for illustrating the steepest descent method based on the search indicators.

In FIG. 15, search points are design parameters using an origin as a start point, and determined by the values of the search indicators of reference points corresponding to the number of design variables and used to make a search in the direction of the boundary 3a between an OK region and an NG region. The reference points are points obtained by incrementing, by predetermined values, respective design variables in axial directions referred to determine next search points. Likewise the search points, the reference points are also the design parameters.

Further, the search points and the reference points are expressed as coordinates indicating the values of the design variables and the values of the search indicators. In n-dimensional design space according to the embodiment, a numerical value "n+1" (i.e., n design variable plus search indicator) is expressed. In an example illustrated in FIG. 15, two-dimensional design space using two design variables is shown for the purpose of simplifying an illustration, and the coordinates include three numerical values of a design variable v1, a design variable v2, and a search indicator.

In FIG. 15, the boundary point acquisition part 32 starts a search at the origin as a search point P0 and calculates the value of a search indicator set by the search indicator setting part 31 (step S0). The search point P0 is expressed as (0,0,10).

The boundary point acquisition part 32 finds a reference point P0a and a reference point P0b where the design variable is incremented by one relative to the search point P0, and calculates the values of the search indicators of the reference point P0a and the reference point P0b (step S1). The reference point P0a is expressed as (1,0,8), and the reference point P0b is expressed as (0,1,9).

The boundary point acquisition part 32 finds a direction in which the value of the search indicator becomes the smallest based on the search point P0, the reference point P0a, and the reference point P0b, and sets a point shifted by one from the search point P0 as a search point P1 (step S2). The search point P1 is expressed as (0.9,0.5,7.7).

Then, the boundary point acquisition part 32 finds a reference point P1a and a reference point P1b where the design variable is incremented by one relative to the search point P1, and calculates the values of the search indicators of the reference point P1a and the reference point P1b (step S3). The reference point P1a is expressed as (1.9,0.5,6.2), and the reference point P1b is expressed as (0.9,1.5,4.7).

Next, the boundary point acquisition part 32 finds a direction in which the value of the search indicator becomes the smallest based on the search point P1, the reference point P1a, and the reference point P1b, and sets a point shifted by one from the search point P1 as a search point P2 (step S4). The search point P2 is expressed as (1.4,1.4,4.7).

Then, the boundary point acquisition part 32 finds a reference point P2a and a reference point P2b where the design variable is incremented by one relative to the search point P2, and calculates the values of the search indicators of the reference point P2a and the reference point P2b (step S5).

Next, the boundary point acquisition part 32 finds a direction in which the value of the search indicator becomes the smallest based on the search point P2, the reference point P2a, and the reference point P2b, and sets a point shifted by one from the search point P2 as a search point P3 (step S6). In this manner, the boundary point acquisition part 32 finds a reference point P3a and a reference point P3b and calculates the values of the search indicators thereof (step S7).

Then, the boundary point acquisition part 32 finds a direction in which the value of the search indicator becomes the smallest based on the search point P3, the reference point P3a, and the reference point P3b, and sets a point shifted by one from the search point P3 as a search point P4 (step S8). In this manner, the boundary point acquisition part 32 finds a reference point P4a and a reference point P4b and calculates the values of the search indicators thereof (step S9).

The boundary point acquisition part 32 repeatedly performs this processing until the value of the search indicator becomes zero, thereby attaining any boundary point Pn (4,3, 0) on the boundary 3a.

The steepest descent method based on the search indicators illustrated in FIG. 15 exemplifies a case in which the values of coordinates are incremented by one when a reference point Pia and a reference point Pib are determined according to a search point Pi. However, finding the values of the search indicators of the reference point Pia and the reference point Pib is aimed at determining a direction in which the value of the search indicator of Pi becomes the smallest, i.e., a direction in which an inclination between the search points becomes the largest. Therefore, the positions of the reference point Pia and the reference point Pib are only required to correspond to the aim. That is, the values of the coordinates to be incremented or decremented are not limited to "one," and may be shifted in a negative direction rather than in a positive direction relative to the search point Pi.

Further, after the direction of the next search point Pi+1 is determined according to the inclination at the search point Pi, the search point is shifted by one in the direction to obtain the search point Pi+1. However, the shifted distance of the search point is not limited to "one." If the shifted distance is too large, the inclination may be varied. Therefore, the shifted distance is made small in order to obtain accuracy. Conversely, where the inclinations at the respective points are constant in the design space 3, errors do not occur even if the shifted distance of the search point is more than "one." Therefore, the search point is controlled to be shifted in a large amount.

Moreover, at a position where the value of the search indicator of the search point Pi is close to "zero," a direction in which the search point Pi is shifted and the variation amount ΔV of the search indicator when the search point Pi is shifted by a unit length in the direction are approximated at the search point Pi based on the values of the search indicators of the reference point Pia and the reference point Pib. For example, a shifted distance from the search point Pi is found using the calculation formula (the value of the search indicator of search point Pi)/ΔV, and a position to which the search point is shifted by the distance is set as the next search point Pi+1.

Figure 16:
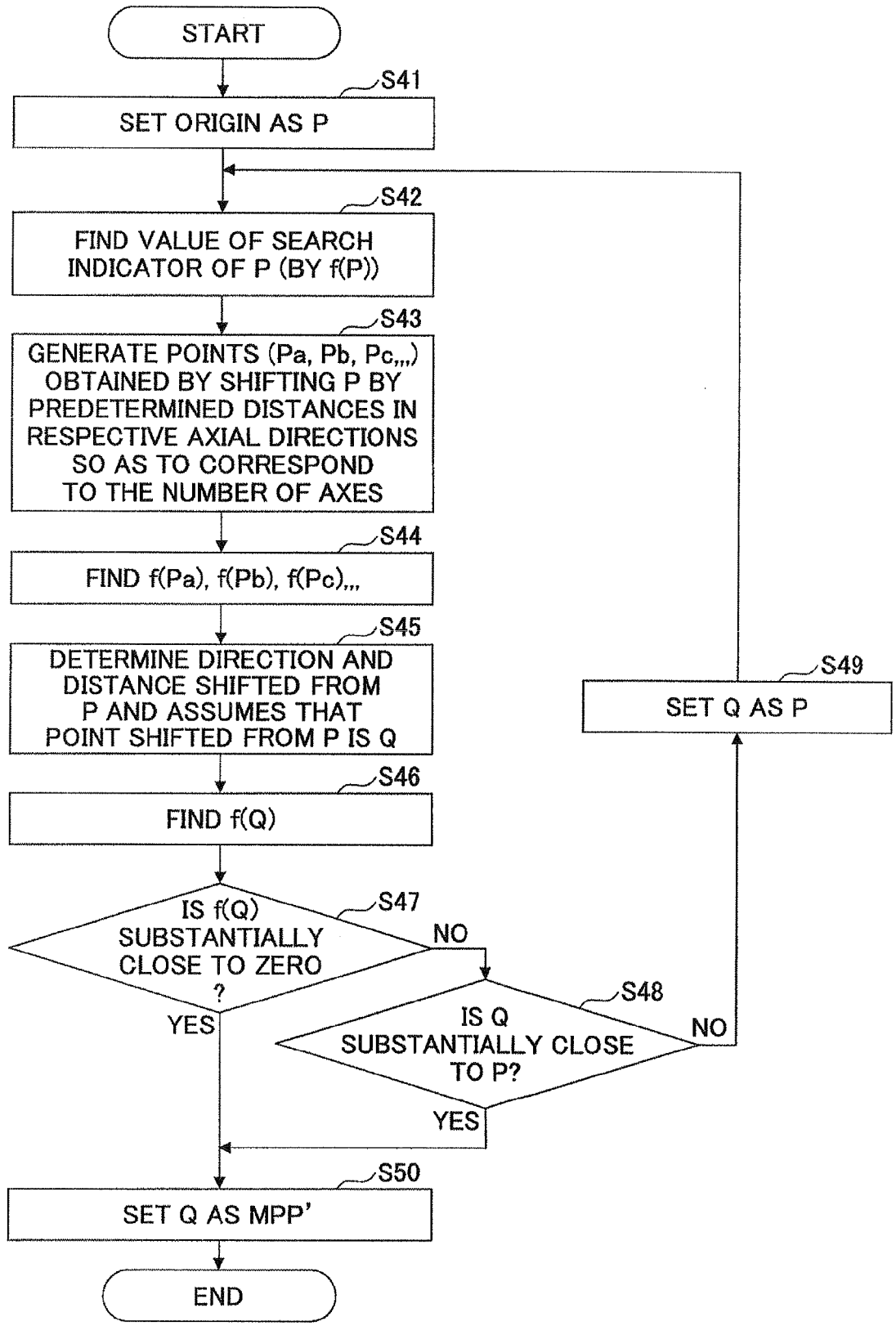
FIG. 16 is a flowchart of the steepest descent method based on search indicators performed by a boundary point acquisition part.

FIG. 16 is a flowchart of the steepest descent method based on search indicators performed by the boundary point acquisition part 32. In FIG. 16, the boundary point acquisition part 32 reads the design parameter 21 (FIG. 5) from the storage region and sets an origin as a first search point P in the design space 3 using the design parameter 21 as the origin (step S41).

Then the boundary point acquisition part 32 finds the value of the search indicator of the search point P (step S42). The value of the search indicator is assumed to be provided by the function f(P). Next, the boundary point acquisition part 32 generates reference points Pa, Pb, Pc, etc., obtained by shifting the search point P by predetermined distances in respective axial directions so as to correspond to the number of axes (step S43).

Then, the boundary point acquisition part 32 finds the values of the search indicators of the generated reference points Pa, Pb, Pc, etc. (step S44). Similar to the case of the search point P, the values of the search indicators of the respective reference points Pa, Pb, Pc, etc., are assumed to be provided by the functions f (Pa), f(Pb) f(Pc), etc., respectively.

Next, the boundary point acquisition part 32 determines a direction and a distance shifted from the search point P, assumes that a point shifted from the search point P is a temporary search point Q (step S45), and finds the value of the search indicator according to the function f(Q) (step S46).

Then, the boundary point acquisition part 32 determines whether the value of the search indicator found according to the function f(Q) is substantially close to zero (step S47). That is, the boundary point acquisition part 32 determines whether the value of the function f(Q) is less than or equal to a threshold substantially close to zero. If the value of the function f(Q) is substantially close to zero, the processing proceeds to step S50.

On the other hand, if the value of the function f(Q) is greater than the threshold substantially close to zero, the boundary point acquisition part 32 further determines whether the temporary search point Q is substantially close to the search point P (step S48). That is, the boundary point acquisition part 32 determines whether a distance between the temporary search point Q and the search point P is less than or equal to a threshold indicating the they are substantially close to each other. If the temporary search point Q and the search point P are substantially close to each other, the processing proceeds to step S50.

On the other hand, if the distance between the temporary search point Q and the search point P is greater than the threshold indicating that they are substantially close to each other, the boundary point acquisition part 32 sets the temporary search point Q as the search point P (step S49) and returns to step S42 to perform the above processing.

If it is determined in step S47 that the value of the function (Q) is substantially close to zero or if it is determined in step S48 that the distance between the temporary search point Q and the search point P is smaller than the threshold indicating that they are substantially close to each other, the boundary point acquisition part 32 sets the temporary search point Q as a boundary point MPP' and outputs the same to the storage region (step S50) to complete the processing.

Next, a description is made of a Monte Carlo simulation in which the most-probable point determination part 33 uses the Monte Carlo simulator 43 to search for a most-probable point. FIG. 17 is a diagram for illustrating a method for determining a most-probable point based on a boundary point by the Monte Carlo simulation.

In FIG. 17, the most-probable point determination part 33 calls on the Monte Carlo simulator 43 to distribute sample points around a boundary point MPP' found by the boundary point acquisition part 32 through variation distribution in the design space 3 and determines whether the samples are OK or NG (step S61). Then, the most-probable point determination part 33 shifts to the sample point closest to the origin out of the sample points determined to be NG (step S62).

The most-probable point determination part 33 calls on the Monte Carlo simulator 43 to distribute sample points around the sample point to which the most-probable point determination part 33 has shifted through the variation distribution and determines whether the sample points are OK or NG (step S63). Then, the most-probable point determination part 33 shifts to the sample point closest to the origin out of the sample points determined to be NG (step S64).

As described above, the most-probable point determination part 33 repeatedly performs the above processing until a distance between the origin and the sample point closest to the origin out of the sample points determined to be NG is beyond the distance between the origin and a central sample point and the most-probable point determination part 33 is not allowed to shift to a next sample point. Thus, the most-probable point determination part 33 sets the sample point closest to the origin near the boundary 3a between the OK region and the NG region as the most-probable point MPP (step S65).

FIG. 18 is a flowchart of processing for determining a most-probable point based on a determination indicator performed by the most-probable point determination part 33. In FIG. 18, the most-probable point determination part 33 reads, from the storage region, a boundary point MPP' that the boundary point acquisition part 32 has found based on search indicators, and sets the read boundary point MPP' as a first central point Pc (step S71).

Then, the most-probable point determination part 33 calls on the Monte Carlo simulator 43 to distribute sample points around the central point Pc (step S72), and determines whether the respective sample points are OK or NG based on a determination indicator (step S73). The Monte Carlo simulator 43 generates, for example, 1000 or more sample points (i.e., design parameters) and makes a determination based on the determination indicator obtained by simulating the operations of the respective sample points.

Unlike the case of a determination based on search indicators, it is possible, in the determination based on the determination indicator, to obtain sample points (design parameters) determined to cause defective products depending on production tolerances where the central point Pc is set as the design parameter.

Referring to an execution result by the Monte Calro simulator 43, the most-probable point determination part 33 determines, out of the sample points, a point Q that is determined to be NG (defective) and the closest to the origin (step S74).

Then, the most-probable point determination part 33 determines whether the central point Pc is substantially close to the point Q (step S75). That is, the most-probable point determination part 33 determines whether a distance between the central point Pc and the point Q is less than or equal to a threshold indicating that they are substantially close to each other. If the distance is less than or equal to the threshold, the processing proceeds to step S78.

On the other hand, if the distance between the central point Pc and the point Q is greater than the threshold indicating that they are substantially close to each other, the most-probable point determination part 33 further determines whether a distance between the origin and the central point Pc is less than or equal to a distance between the origin and the point Q (step S76). If the distance between the origin and the central point Pc is greater than the distance between the origin and the point Q, the most-probable point determination part 33 sets the point Q as the central point Pc (step S77) and returns to step S72 to execute the above processing.

If it is determined in step S75 that the central point Pc and the point Q are substantially close to each other or if it is determined in step S76 that the distance between the origin and the central point Pc is less than or equal to the distance between the origin and the point Q, the most-probable point determination part 33 sets the central point Pc as the most-probable point MPP and outputs the same to the most-probable point 29 of the storage region (step S78) to complete the processing.

As described above, any boundary point on the boundary between the OK (non-defective status) region and the NG (defective status) region of manufacturing tolerances can be specified by applying, as the design parameters, the search indicators for determining the superiority/inferiority such as a degree of stability in operations in the same determination region, the search indicator being different from the determination indicator for determining the superiority/inferiority.

Further, the boundary between the non-defective status and the defective status can be specified based on the Monte Carlo simulation using the determination indicator that determines the defective/non-defective status using the boundary point as the central point. Moreover, the most-probable point closest to the origin inside the boundary and an optimum design point meeting the determination indicator and achieving the best performance can be specified.

The above embodiment refers but is not limited to executing the DC simulation and the transient simulation so as to acquire the values of the search indicators. Instead, a calculation method capable of determining the superiority/inferiority between the design parameters may be employed.

All examples and conditional language recited herein are intended for pedagogical purposes to aid the reader in understanding the present invention and the concepts contributed by the inventor to furthering the art, and are to be construed as being without limitation to such specifically recited examples and conditions, and the organization of such examples in the specification does not relate to a showing of the superiority or inferiority of the present invention. Although the embodiment of the present invention has been described in detail, it should be understood that the various changes, substitutions, and alterations could be made hereto without departing from the spirit and scope of the present invention.

What is claimed is:

1. A simulation method, comprising:
   determining, by a computer, a non-defective status or a defective status due to multiple design parameters used to design a Static Random Access Memory cell based on a determination indicator and a search indicator, the determination indicator acquired by an operation simulation of the Static Random Access Memory cell, the search indicator acquired during the operation simulation, being different from the determination indicator, and being related to characteristics of the Static Random Access Memory cell;
   specifying, by the computer, a boundary between areas of the non-defective status and the defective status in a design space with one of the multiple design parameters as an origin based on a determination result of the non-defective status or the defective status of the multiple design parameters;
   performing, by the computer, the operation simulation at each of multiple sample points, in which a boundary point is acquired on the boundary between the areas of the non-defective status and the defective status by comparison using the search indicator between the multiple design parameters, and the multiple sample points are distributed by using a Monte Carlo simulation around the boundary point;
   determining, by the computer, a first point of the multiple sample points, which is determined as being in the defective status based on the determination indicator acquired by the operation simulation and is nearest the origin on the boundary; and
   determining, by the computer, the boundary point being the nearest the origin on the boundary of the areas of the non-defective status and the defective status as being the nearest the origin, when a distance between the boundary point and the first point is less than a threshold.

2. The simulation method as claimed in claim 1, wherein the search indicator is a noise margin indicating a stability of the Static Random Access Memory cell.

3. The simulation method as claimed in claim 1, wherein the search indicator is a smallest value of a potential difference between nodes of the Static Random Access Memory cell.

4. The simulation method as claimed in claim 1, further comprising:
   comparing a first distance between the boundary point and the origin with a second distance between the first point and the origin when a distance between the boundary point and the first point is less than or equal to the threshold;
   determining the boundary point as being the nearest the origin when the first distance is less than the second distance, and replacing the first point with the boundary point when the first distance is greater than the threshold; and
   repeating the determining the first point.

* * * * *

UNITED STATES PATENT AND TRADEMARK OFFICE
CERTIFICATE OF CORRECTION

| | | |
|---|---|---|
| PATENT NO. | : 9,064,070 B2 | Page 1 of 1 |
| APPLICATION NO. | : 13/022359 | |
| DATED | : June 23, 2015 | |
| INVENTOR(S) | : Hiroshi Ikeda | |

It is certified that error appears in the above-identified patent and that said Letters Patent is hereby corrected as shown below:

On the title page

Assignee reads:

(73) Assignee: ~~FUJITSU SEMICONDUCTOR LIMITED~~, Yokohama (JP)

Should read:

(73) Assignee: SOCIONEXT INC., Yokohama (JP)

Signed and Sealed this
Twenty-seventh Day of October, 2015

Michelle K. Lee
*Director of the United States Patent and Trademark Office*